United States Patent
Conway et al.

(10) Patent No.: US 12,354,632 B1
(45) Date of Patent: Jul. 8, 2025

(54) PARALLEL SELF-SERVO WRITE IN A DATA STORAGE DEVICE

(71) Applicant: Western Digital Technologies, Inc., San Jose, CA (US)

(72) Inventors: Richard Conway, San Jose, CA (US); Guoxiao Guo, Irvine, CA (US); Yanning Liu, San Jose, CA (US); Joey M. Poss, Rochester, MN (US); Ryan Mayo, Aliso Viejo, CA (US); Scott A. Ottele, Longmont, CO (US); Charles A. Park, Aromas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/596,325

(22) Filed: Mar. 5, 2024

(51) Int. Cl.
*G11B 5/596* (2006.01)

(52) U.S. Cl.
CPC ...... *G11B 5/59666* (2013.01); *G11B 5/59661* (2013.01)

(58) Field of Classification Search
None
See application file for complete search history.

(56) References Cited

U.S. PATENT DOCUMENTS

| | | |
|---|---|---|
| 4,249,538 A | 2/1981 | Musha |
| 4,642,709 A | 2/1987 | Vinal |
| 5,023,733 A * | 6/1991 | Koga ............ G11B 5/5552 360/99.18 |
| 5,329,554 A | 7/1994 | Behrens |
| 5,335,123 A | 8/1994 | Shimizu |
| 5,430,584 A | 7/1995 | Petersen |
| 5,530,600 A | 6/1996 | Shrinkle |
| 5,570,241 A | 10/1996 | Nielsen |
| 5,640,286 A | 6/1997 | Acosta |
| 5,659,437 A | 8/1997 | Tsunekawa |
| 5,822,143 A | 10/1998 | Cloke |
| 6,111,717 A | 8/2000 | Cloke |
| 6,211,638 B1 | 4/2001 | Heaton |
| 6,366,423 B1 | 4/2002 | Ahn |
| 6,400,520 B1 | 6/2002 | Stoutenburgh |
| 6,483,659 B1 | 11/2002 | Kobayashi |
| 6,587,293 B1 | 7/2003 | Ding |
| 6,606,216 B1 | 8/2003 | Liikanen |

(Continued)

OTHER PUBLICATIONS

Kun, M. (2017). "Servo Pattern Enhancements for High Areal Density Hard Disk Drives." Doctoral dissertation, Nanyang Technological University, School of Electrical & Electronic Engineering.

*Primary Examiner* — Peter Vincent Agustin
(74) *Attorney, Agent, or Firm* — Patent Law Works LLP

(57) ABSTRACT

Example control circuitry, data storage devices, and methods for parallel self-servo write in a data storage device are described. The data storage device may include multiple heads actuated over different surfaces of a data storage device and receive read signals from two different heads over two different surfaces in parallel. Position error signals may be determined from each read signal and corresponding position compensation values may be determined for their respective microactuators. Application of these compensation values may maintain their relative positions for parallel writing of servo tracks based on their respective spiral reference patterns and TPI settings.

22 Claims, 21 Drawing Sheets

(56) References Cited

U.S. PATENT DOCUMENTS

| | | | |
|---|---|---|---|
| 6,693,760 B1 | 2/2004 | Krounbi | |
| 7,151,645 B2 | 12/2006 | Won | |
| 7,333,280 B1 * | 2/2008 | Lifchits | G11B 5/596 360/75 |
| 7,511,912 B2 | 3/2009 | Wilson | |
| 7,667,911 B2 | 2/2010 | Lau | |
| 8,107,188 B2 | 1/2012 | Lau | |
| 8,477,442 B2 | 7/2013 | Albrecht | |
| 8,537,486 B2 | 9/2013 | Liang | |
| 8,693,134 B1 | 4/2014 | Xi | |
| 9,013,824 B1 | 4/2015 | Guo | |
| 9,142,246 B1 | 9/2015 | Trantham | |
| 9,286,925 B1 | 3/2016 | Shepherd | |
| 9,343,094 B1 | 5/2016 | Ma | |
| 9,865,290 B1 | 1/2018 | Liang | |
| 9,940,967 B1 | 4/2018 | French, Jr. | |
| 9,972,349 B1 | 5/2018 | French, Jr. | |
| 10,164,592 B1 | 12/2018 | Matousek | |
| 10,199,054 B1 | 2/2019 | Nichols | |
| 10,783,911 B1 * | 9/2020 | Tsai | G11B 5/59688 |
| 10,867,629 B1 * | 12/2020 | Kiyonaga | G11B 5/5569 |
| 10,950,265 B1 | 3/2021 | Noda | |
| 10,964,345 B1 | 3/2021 | Haapala | |
| 11,049,517 B1 * | 6/2021 | Ryan | G11B 5/5526 |
| 11,430,481 B2 | 8/2022 | Katchmart | |
| 11,532,326 B1 | 12/2022 | Laks | |
| 11,557,320 B1 | 1/2023 | Katchmart | |
| 11,568,894 B1 | 1/2023 | Szita | |
| 11,574,650 B1 | 2/2023 | Liang | |
| 11,735,210 B2 | 8/2023 | Poss | |
| 11,735,215 B2 | 8/2023 | Kuwahara | |
| 11,776,570 B2 | 10/2023 | Szita | |
| 11,935,571 B1 | 3/2024 | Katchmart | |
| 11,942,122 B1 | 3/2024 | Calfee | |
| 2001/0000981 A1 | 5/2001 | Nguyen | |
| 2001/0040754 A1 | 11/2001 | Heaton | |
| 2002/0012193 A1 | 1/2002 | Kobayashi | |
| 2002/0036860 A1 | 3/2002 | Bi | |
| 2002/0057068 A1 | 5/2002 | Ho | |
| 2002/0101681 A1 | 8/2002 | He | |
| 2003/0112539 A1 | 6/2003 | Shu | |
| 2006/0114598 A1 | 6/2006 | Lee | |
| 2008/0253018 A1 | 10/2008 | Ryu | |
| 2011/0249354 A1 | 10/2011 | Kosugi | |
| 2013/0038959 A1 * | 2/2013 | Liang | G11B 5/59627 |
| 2013/0314817 A1 | 11/2013 | Otsuki | |
| 2016/0253108 A1 | 9/2016 | Jurey | |
| 2016/0358621 A1 | 12/2016 | French, Jr. | |
| 2019/0279675 A1 | 9/2019 | Schmidt | |
| 2020/0286513 A1 | 9/2020 | Schmidt | |
| 2022/0076703 A1 | 3/2022 | Katchmart | |
| 2022/0310117 A1 | 9/2022 | Itou | |

* cited by examiner

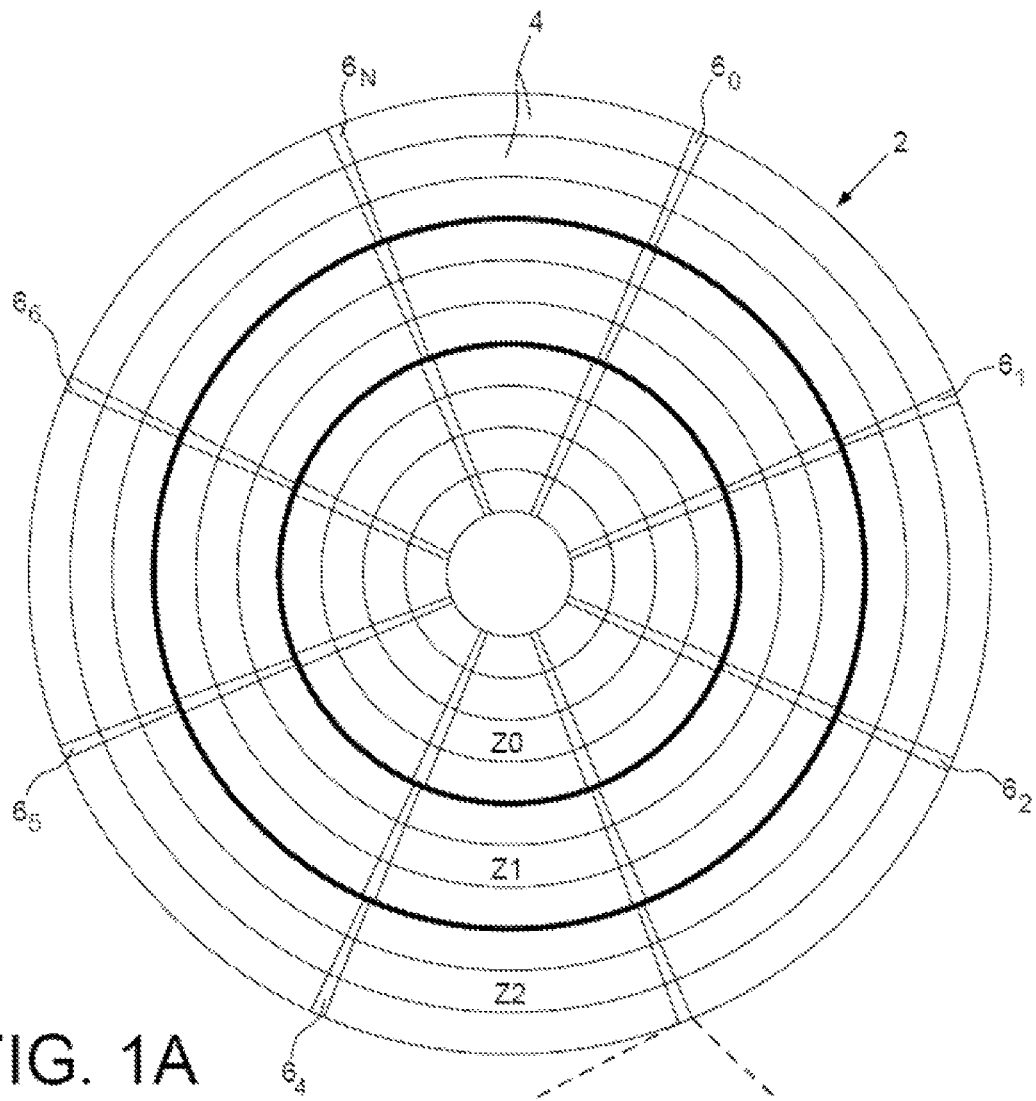
FIG. 1A
(Prior Art)
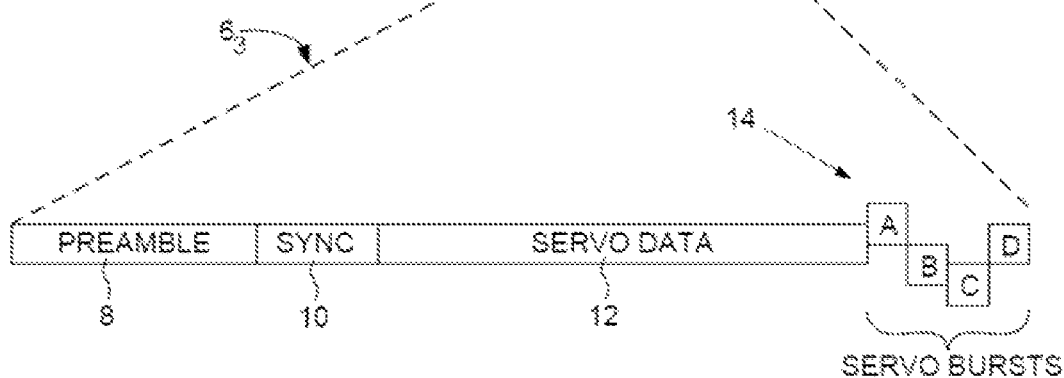

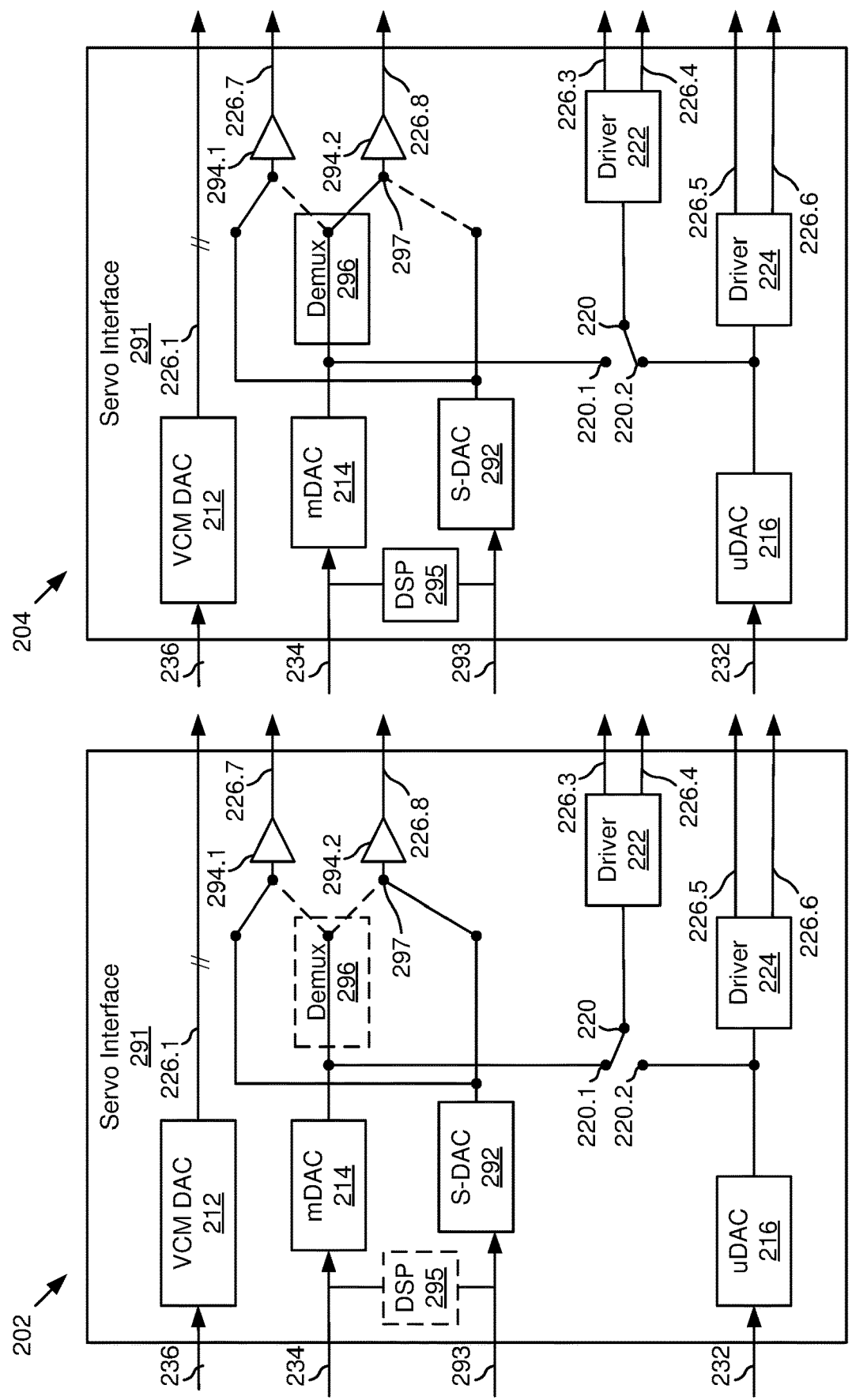

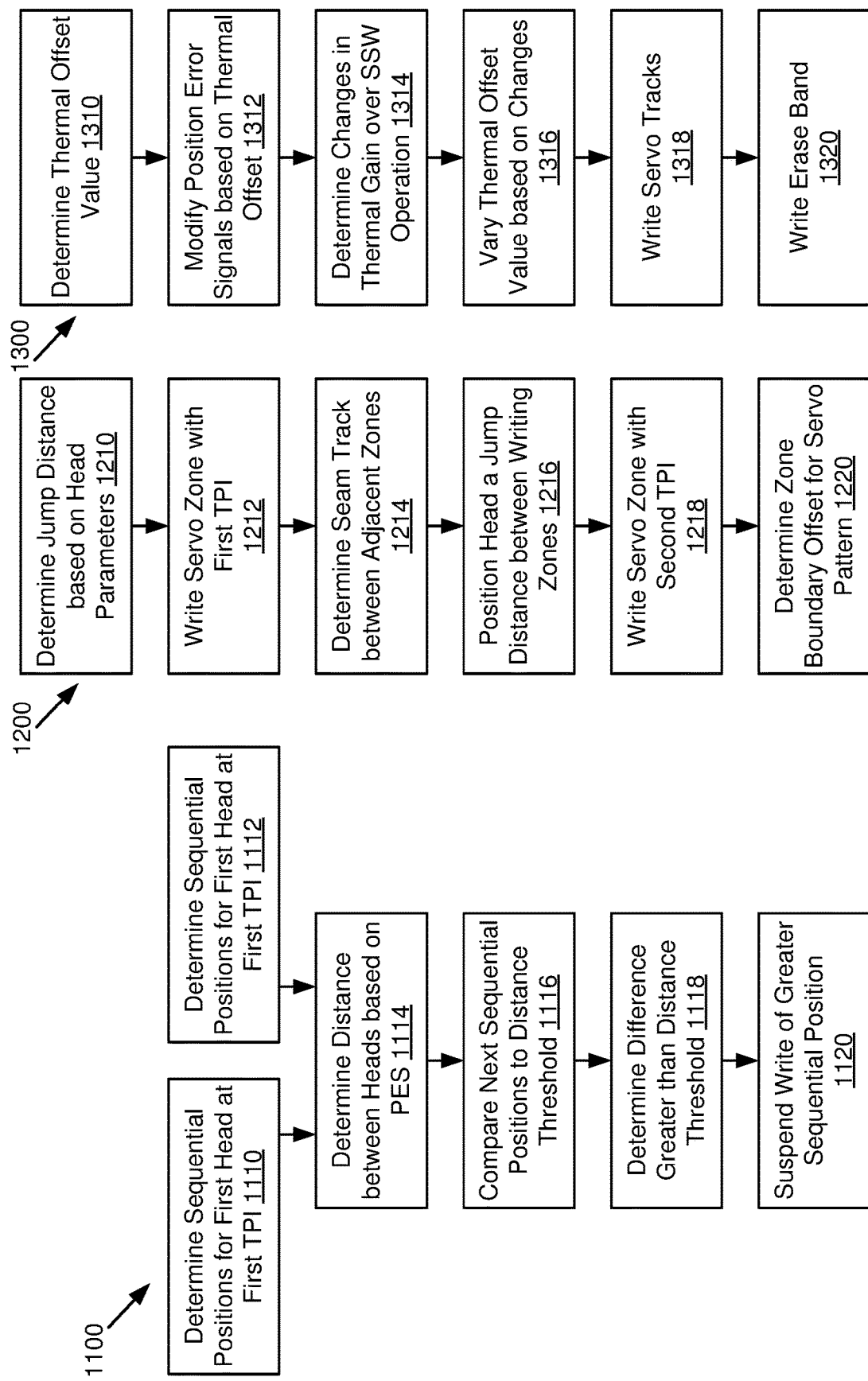

PARALLEL SELF-SERVO WRITE IN A DATA STORAGE DEVICE

TECHNICAL FIELD

The present disclosure relates to the self-servo writing process for data storage devices. In particular, the present disclosure relates to using data storage device hardware circuitry, which may include read/write paths for two-dimensional magnetic recording, to write servo tracks on two heads in parallel.

BACKGROUND

The self-servo write (SSW) process is a pivotal step in the manufacturing of hard disk drives (HDDs), which are used extensively for data storage in various computing devices. This process involves the creation of servo tracks on the magnetic disk surfaces within the HDD. Servo tracks are used by the drive's control system to accurately position the read/write heads over data tracks during operation. The precision of servo track writing is integral to the drive's performance, as it directly impacts the areal density and reliability of the data storage.

Traditionally, servo track writing could be categorized into two primary methods: external and internal. External servo writing requires the positioning information to be written onto the disk before it is assembled into the HDD, often using specialized equipment. In contrast, internal writing, or SSW, utilizes the HDD's own read/write heads to write the servo information after the disk assembly is installed in the drive. SSW offers the advantage of aligning the servo tracks with the final assembled state of the drive, accounting for any variations that may occur during assembly.

The SSW process begins with the disk surfaces being initially blank. As the disks rotate, a servo writer embedded within the HDD writes a series of spiral reference patterns onto the disk, such as by sweeping the write heads between inner and outer diameters at a known rate and writing a known pattern of magnetic transitions. These spiral reference patterns provide positioning information that may be used to write the production servo pattern to the disk surfaces.

An example servo pattern is illustrated in FIG. 1A. The prior art disk format of FIG. 1A comprises a number of servo sectors 60-6N recorded around the circumference of the disk 2 that define a plurality of servo tracks, wherein the data tracks 4 are defined relative to the servo tracks. Each servo sector 6; may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6; may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations. In some configurations, servo and data tracks may be banded together to form different physical zones written at different track densities or frequencies, such as from the inner diameter of the disk (Z0) to the outer diameter of the disk (Z2).

Self-servo writing may be a lengthy process, particularly for data storage devices that include a large number of storage media disks. For example, some HDD form factors may include as many as 10 platters, each comprising two storage media surfaces. Therefore, writing servo tracks on multiple surfaces in parallel using multiple read/write heads may be advantageous. However, HDD control circuitry may not be designed to support simultaneous reading and writing of different heads on different surfaces. While specialized control circuitry could be provided external to the HDD control circuitry (with appropriate interfaces and data channels to and from the internal heads and actuators) or added to the internal HDD circuitry, the impact on the HDD cost for hardware that would only be used during the self-servo write process may be undesirable.

There is a need for technology that improves the onboard hardware efficiency of self-servo writing control circuitry for parallel self-servo writing.

SUMMARY

Various aspects for data storage devices supporting parallel self-servo writing are described, particularly using control circuitry that supports both self-servo writing and production read/write operations in data storage devices configured for two-dimensional magnetic recording (TDMR) with multiple read/write elements on each head and corresponding read/write paths.

One general aspect includes a data storage device including control circuitry configured to: receive a first read signal from a first head actuated over a first storage medium surface; receive a second read signal from a second head actuated over a second storage medium surface, where the first read signal and the second read signal are received in parallel; determine a first position error signal from the first read signal; determine a second position error signal from the second read signal; determine, based on the first position error signal a first position compensation value; determine, based on the second position error signal, a second position compensation value; apply the first position compensation value to a first actuator on a first arm for the first head to position the first head; and apply the second position compensation value to a second actuator on a second arm for the second head to position the second head.

Implementations may include one or more of the following features. The control circuitry may be further configured to: determine, based on a difference between the first position error signal and the second position error signal, a third position compensation value; and apply the third compensation value to at least one actuator to compensate for an offset between the first position error signal and the second position error signal. The control circuitry may be further configured to: determine, based on the first position error signal and the second position error signal, a gross position compensation value; and apply the gross position compensation value to a motor control circuit configured to synchronously move the first arm and the second arm. The control circuitry may be further configured to: determine, based on the first position compensation value and the first position error signal, a first decoupled position error signal; determine, based on the second position compensation value and the second position error signal, a second decoupled position error signal; and average the first decoupled position error signal and the second decoupled position error signal to determine the gross compensation value. The first read signal may be responsive to a first self-servo write reference spiral on the first storage medium surface; the second read signal may be responsive to a second self-servo write reference spiral on the second storage medium surface; and the control circuitry may be further configured to write, using the first head, a first set of servo tracks to the first storage medium surface and write, using the second head, a second set of servo tracks to the second storage medium in parallel with writing the first set of servo tracks. The control circuitry may be further configured to: position the first head using the first self-servo write reference spiral to determine sequential positions for writing the first set of servo tracks using a first tracks per inch parameter; position the second head using the second self-servo write reference spiral to determine positions for writing the second set of servo tracks using a second tracks per inch parameter; and suspend, responsive to a next sequential position of the first head being greater than a distance threshold for a next sequential position of the second head, writing of the first set of servo tracks for at least one revolution while continuing to write the second set of servo tracks. The distance threshold may be based on a stroke capability of the first actuator and the second actuator. The control circuitry may be further configured to: position the first head using the first position error signal to determine a direct current position compensation value and a first alternating current position compensation value for the first position compensation value; and position the second head using the second position error signal to determine a second alternating current position compensation value for the second position compensation value. The control circuitry is further configured to: subtract a first direct current component of the first position compensation value from the second position compensation value; and subtract a second direct current component of the second position compensation value from the first position compensation value. The first set of servo tracks may include: at least two adjacent zones of servo tracks having different track per inch parameters in each adjacent zone; and at least one seam track at a boundary between the at least two adjacent zones. The control circuitry may be further configured to position, responsive to the at least one seam track, the first head a jump distance between writing the servo tracks of the at least two adjacent zones based on a read/write offset between a read element and a write element of the first head and a difference between a first writer width of the first head and a second writer width of the second head. The control circuitry may be further configured to: determine, based on thermal changes impacting a position relationship between the first head and the second head, a thermal offset value; modify, based on the thermal offset value, the first position error signal; and vary the thermal offset value over operation of a self-servo write mode. The control circuitry may be further configured to write, responsive to writing the first set of servo tracks, an erase band of tracks using an erase pattern, and the erase band may have an erase band width based on a range of thermal offset values.

Another general aspect includes a method including: receiving a first read signal from a first head actuated over a first storage medium surface; receiving a second read signal from a second head actuated over a second storage medium surface, where the first read signal and the second read signal are received in parallel; determining a first position error signal from the first read signal; determining a second position error signal from the second read signal; determining, based on the first position error signal a first position compensation value; determining, based on the second position error signal, a second position compensation value; applying the first position compensation value to a first actuator on a first arm for the first head to position the first head; and applying the second position compensation value to a second actuator on a second arm for the second head to position the second head.

Implementations may include one or more of the following features. The method may include: determining, based on a difference between the first position error signal and the second position error signal, a third position compensation value; and applying the third compensation value to at least one actuator to compensate for an offset between the first position error signal and the second position error signal. The method may include: determining, based on the first position error signal and the second position error signal, a gross position compensation value; and applying the gross position compensation value to a motor control circuit configured to synchronously move the first arm and the second arm. The method may include: determining, based on the first position compensation value and the first position error signal, a first decoupled position error signal; determining, based on the second position compensation value and the second position error signal, a second decoupled position error signal; and averaging the first decoupled position error signal and the second decoupled position error signal to determine the gross compensation value. The method may include: writing, using the first head, a first set of servo tracks to the first storage medium surface, where the first read signal is responsive to a first self-servo write reference spiral on the first storage medium surface; and writing, using the second head, a second set of servo tracks to the second storage medium in parallel with writing the first set of servo tracks, where the second read signal is responsive to a second self-servo write reference spiral on the second storage medium surface. The method may include: positioning the first head using the first self-servo write reference spiral to determine sequential positions for writing the first set of servo tracks using a first tracks per inch parameter; positioning the second head using the second self-servo write reference spiral to determine positions for writing the second set of servo tracks using a second tracks per inch parameter; and suspending, responsive to a next sequential position of the first head being greater than a distance threshold for a next sequential position of the second head, writing of the first set of servo tracks for at least one revolution while continuing to write the second set of servo tracks. The method may include positioning, responsive to at least one seam track, the first head a jump distance between writing the servo tracks of at least two adjacent zones based on: a read/write offset between a read element and a write element of the first head; and a difference between a first writer width of the first head and a second writer width of the second head, where the at least two adjacent zones of servo tracks have different track per inch parameters and the at least one seam track at a boundary between the at least two adjacent zones. The method may include: determining, based on thermal changes impacting a position relationship between the first head and the second head, a thermal offset value; modifying, based on the thermal offset value, the first position error signal; and varying the thermal offset value over operation of a self-servo write mode. The method may include writing, responsive to writing the first set of servo tracks, an erase band of tracks using an erase pattern, where the erase band has an erase band width based on a range of thermal offset values.

Still another general aspect includes a data storage device including: a first head actuated over a first storage medium surface; a second head actuated over a second storage medium surface; means for receiving a first read signal from the first head; means for receiving a second read signal from the second head, where the first read signal and the second read signal are received in parallel; means for determining a first position error signal from the first read signal; means for determining a second position error signal from the second read signal; means for determining, based on the first position error signal a first position compensation value; means for determining, based on the second position error signal, a second position compensation value; means for applying the first position compensation value to a first actuator on a first arm for the first head to position the first head; and means for applying the second position compensation value to a second actuator on a second arm for the second head to position the second head.

The present disclosure describes various aspects of innovative technology capable of improving self-servo writing to reduce data storage device production time/cost while also controlling cost impact on the control circuitry within the data storage device. The various embodiments include operations and control circuitry to overcome or at least reduce issues previously encountered in data storage devices and, accordingly, are more efficient, reliable, and/or cost-effective than other data storage devices. That is, the various embodiments disclosed herein include hardware and/or software with functionality to improve data storage device cost, quality, and manufacturing time, such as by using control circuitry that supports both two head parallel self-servo writing, hereafter self-servo writing or SSW for brevity, and one head production read/write operations in data storage devices. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

FIG. 1A is a diagram of a prior art disk format comprising a plurality of servo sectors defining servo tracks.

FIGS. 2C and 2D are diagrams of another example servo interface circuit for the control circuitry of FIGS. 2A and 2B in self-servo write and read/write operating modes.

FIG. 11 is an example method of compensating for different track positions between the two heads in parallel self-servo writing.

FIG. 12 is an example method of managing seams between adjacent servo zones with different frequencies.

FIG. 13 is an example method of managing thermal creep during parallel self-servo writing.

DETAILED DESCRIPTION

Parallel self-servo write (SSW) based on concurrent SSW fill using onboard data storage device electronics and independent micro dual stage actuator position control may improve SSW test time without significantly impacting the cost of the electronics. In some configurations, the data storage device reads one head from an upper bank preamplifier circuit and one head from a lower bank preamplifier circuit in parallel based on spiral reference patterns previously written to the disk. The channel processes the spiral position and timing detection using the storage device controller and decoupled two-dimensional magnetic recording (TDMR) channels. Separate micro actuator drivers for the heads on the two banks provide separate positioning based on a shared voice coil motor (VCM) position. The SSW firmware may calculate the two heads position errors and phase errors in parallel. The VCM may track the average decoupled position error signal (PES), while each micro actuator compensates for its respective PES. In some configurations, phase control may also be handled separately for the two heads. In some configurations, multiple passes of positioning based on previously written spirals to write better spirals before ultimately writing the concentric servo tracks and corresponding servo sectors for the production servo pattern may be used.

Figure 1B:
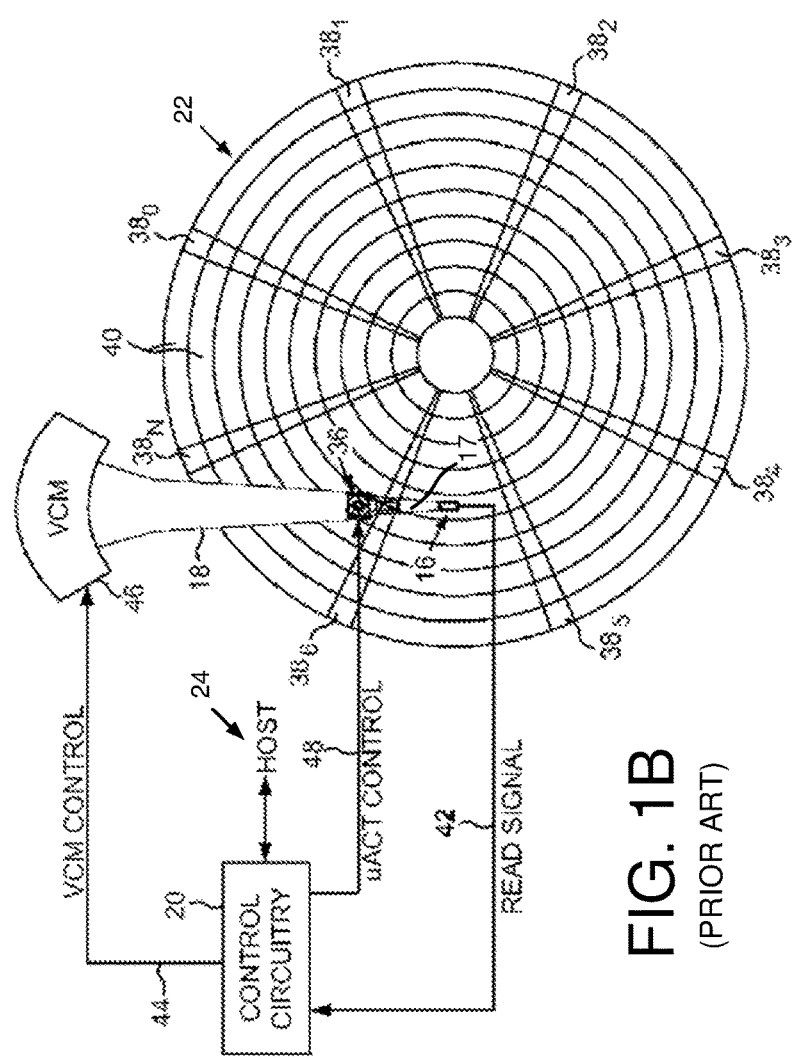
FIGS. 1B and 1C are diagrams of a prior art data storage device in the form of a disk drive comprising at least one head actuated over a disk surface using control circuitry and a corresponding side view of an arm/actuator assembly for two banks of heads.

In FIG. 1B control circuitry 20 of a data storage device, such as a hard disk drive (HDD), processes a read signal 42 emanating from the head 16 to demodulate the servo sectors 380-38N and generate a position error signal (PES) representing an error between the actual position of the head and a target position relative to a target track in a track follow operation. Control circuitry 20 filters the PES using suitable compensation filters to generate a plurality of control signals for positioning head 16 relative to the surface of disk 22. A VCM control signal may be applied to a VCM 46 which rotates an actuator arm 18 about a pivot, thereby actuating head 16 radially over disk 22 in a direction that reduces the PES. A milli actuator control signal 48 may be applied to a piezoelectric actuator 36 on suspension 17 near the tip of arm 18 to provide fine lateral positioning to further reduce the PES. This actuator hereafter may be called milli actuator or suspension actuator. In some configurations, additional actuators may be provided on suspension 17, such as a micro actuator positioned even closer to head 16 and receiving still another control signal from control circuitry 20. This actuator hereafter may be called micro actuator or head actuator. Servo sectors 380-38N may comprise any suitable position information, such as a servo track and wedge address for coarse positioning and servo bursts for fine positioning as described above with reference to FIG. 1A. The servo bursts may comprise any suitable pattern, such as an amplitude-based servo pattern as shown in FIG. 1A, or a suitable phase-based servo pattern. During data read/write operations, control circuitry 20 may use the feedback from servo sectors 380-38N to position head 16 over disk 22 to seek to and follow desired data tracks for data read and write operations. For example, control circuitry 20 may receive host storage commands from host 24 through a host interface and determine corresponding data read and write operations to read previously written data from disk 22 or write new data to disk 22.

Figure 1C:
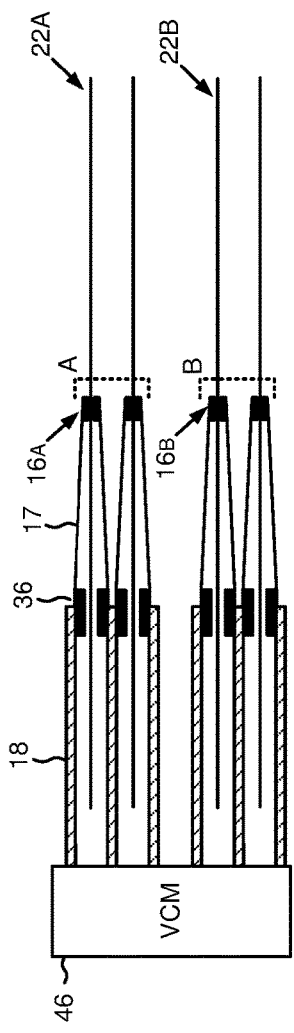

In FIG. 1C, a side view of the head and disk stacks of a data storage device comprised of multiple disks 22 and corresponding heads 16. For example, each disk 22 may include two recordable storage media surfaces on opposing surfaces of the disk and read by corresponding heads. In FIG. 1C, the disk stack includes four disks, eight storage medium surfaces, and eight corresponding heads. The heads and disks may be grouped in banks. For example, disks 22A and heads 16A may correspond to a first bank of heads and media and disks 22B and heads 16B may correspond to a second bank of heads and media. In some configurations, a single VCM 46 may provide gross positioning of both head banks over the corresponding media surfaces. In some configurations, a split actuator may include separate VCMs (and receive corresponding control signals) for the different head banks. Additionally, each arm may include one or more arm or head actuators 36, such as piezoelectric micro actuators, somewhere along the length of suspension 17. Each suspension or head actuator may be individually controlled when the corresponding head is the active head for reading or writing data. In some configurations, each bank of heads may include a corresponding preamplifier circuit and flex circuit connection to the data storage device controller circuit.

Figure 2A:
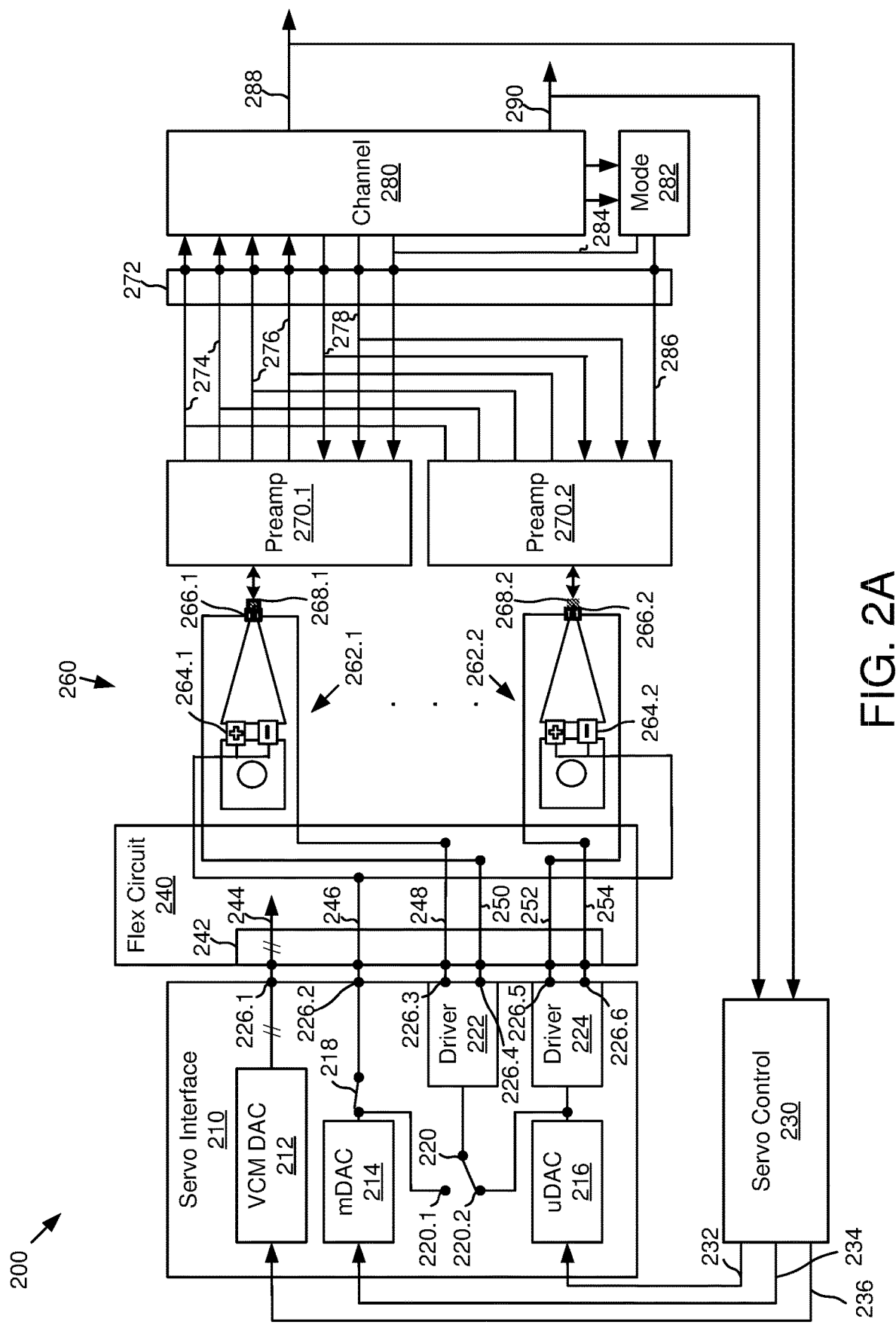
FIGS. 2A and 2B are diagrams of control circuitry operating in two different modes to support self-servo write and read/write operations.
Figure 2B:
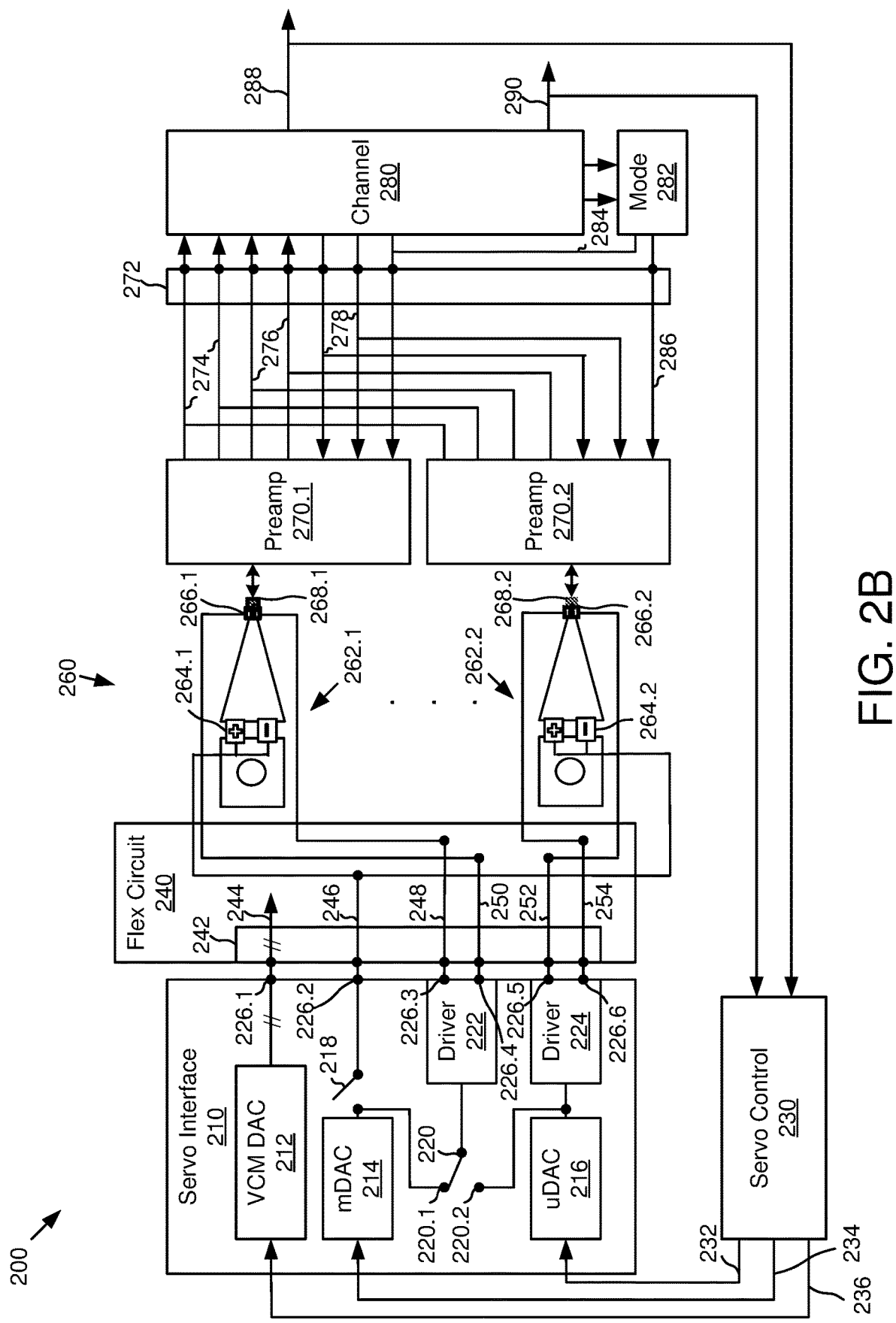

FIGS. 2A and 2B show an example configuration of control circuitry 200 for positioning heads organized in two head banks in a data storage device. In FIG. 2A, control circuitry 200 is configured for data read/write operations that are positioned based on the servo data written during the self-servo write operation, and, in FIG. 2B, control circuitry 200 is configured for self-servo write operation (during the self-servo write portion of the manufacturing and test process). In the configuration shown, control circuitry 200 includes servo interface circuit 210, servo control circuit 230 (sometimes referred to as a servo interface controller), flex circuit 240, preamplifier circuits 270, read/write channel 280, and a variety of connections (such as wires or traces) and interfaces (such as pins or connectors). Control circuitry 200 interacts with head banks 260 for both actuator control and read and write signals. Only a portion of one suspension assembly 262 is shown for each head bank, but each head bank may include multiple suspensions and heads corresponding to the number of storage media surfaces in the disk stack. For example, a four platter HDD may include eight suspension/heads organized in two banks of four heads or a ten platter HDD may include twenty suspension/heads organized in two banks of ten heads. Control circuitry 200 may be switchable to select any head (and corresponding actuators) from each stack for parallel SSW operation, so only the control paths for the selected heads are shown.

Servo interface circuit 210 may include a set of motor or actuator drivers for positioning the heads over the media surfaces. Servo interface circuit 210 may receive digital servo control signals calculated by servo control logic 230 to generate an analog control signal for the respective motors or actuators. Each circuit for generating the analog control signal for a motor or actuator may be referred to as a motor or actuator control circuit. For example, servo interface circuit 210 may include a VCM digital-to-analog converter (DAC) 212 configured to receive a digital position control signal for the VCM and convert it into a pair of analog control signals suitable to drive the VCM to the desired position. Milli actuator DAC 214 may be configured to provide an actuator control signal to the milli actuator (e.g., piezoelectric actuator on the suspension near arm tip) of the selected head during read/write mode or the micro actuator of the second head during self-servo write mode. Milli actuator DAC 214 may be configured to receive a digital position control signal for the milli actuator or, in the parallel self-servo write mode, the second micro actuator and convert the digital control signal to the analog control signal provided to that actuator through a dual-phase driver block 222. Micro actuator DAC 216 may be configured to provide an actuator control signal to the micro actuator (e.g., piezoelectric actuator closest to the head) of the selected head during read/write mode or self-servo write mode. Micro actuator DAC 216 may be configured to receive a digital position control signal for the selected micro actuator and convert the digital control signal to the analog control signal provided to that actuator. In some configurations, micro actuator DAC 216 may be coupled to a pair of dual-phase driver circuits 222 and 224. The dual-phase driver circuits 222 and 224 may amplify a same phase and an inverted phase of the analog control signal from micro actuator DAC 216 prior to sending them to the micro actuators of the selected heads. The dual-phase driver circuits 222 and 224 may generate alternating current (AC) control signals for the connected micro actuators. This configuration supports the read/write mode. In the parallel self-servo write mode, the 216 only drives the block 224, whereas the block 222 is controlled by DAC 214.

Servo interface circuit 210 may include one or more switches for changing operation and/or control paths of the DACs between the self-servo write mode and the data read/write mode. For example, switch 218 may determine whether milli actuator DAC 214 is electrically connected to the milli actuator for the target head in read/write mode or controls one of the micro actuators during self-servo write mode. Switch 220 may select whether dual-phase driver circuit 222 is connected to milli actuator DAC 214 or micro actuator DAC 216.

In FIG. 2A, switch 218 is closed, connecting milli actuator DAC 214 to the milli actuator of the target head for the read/write operation and selection of the preamp may determine which head is being controlled (from the first or second head bank). Switch 220 is on for path 220.2 to connect micro actuator DAC 216 to both dual-phase driver circuits 222 and 224. This allows micro actuator DAC 216 to drive the micro actuator of the target head for the read/write operation, also based on the preamps determining which head is being controlled. This mode corresponds to the regular read/write.

In FIG. 2B, switch 218 is open, disconnecting milli actuator DAC 214 from the milli actuators. Switch 220 is on for path 220.1 to connect milli actuator DAC 214 to dual-phase driver circuit 222 and thereby control the micro actuator of one of the target heads while micro actuator DAC 216 maintains its connection to dual-phase driver circuit 224 to control the micro actuator of the other target head for parallel self-servo write.

In some configurations, servo interface circuit 210 may include a plurality of interface connections 226.1-226.6 to connect the control paths from the DACs to the respective motors or actuators through flex circuit 240. For example, flex circuit 240 may include a plurality of wires or traces that connect to pin interfaces from servo interface circuit 210 and provide an electrical connection to the input interface connections on the respective motor or actuator assemblies. Flex circuit 240 may comprise an interface connector 242 that connects to board-based circuitry in the data storage device, such as a printed circuit board assembly (PCBA) comprising the device controller, servo interface circuit 210, servo control logic 230, and channel 280. For diagram purposes, interfaces connections 272 between channel 280 and preamplifier circuits 270 are shown separately, but may be part of the same pin interfaces 242 and traces through flex circuit 240. Flex circuit 240 may receive a pair of VCM control signals 244 and electrically connect it in a VCM control path to the VCM moving the head stack. Flex circuit 240 may receive a milli actuator control signal 246 and electrically connect it in a milli actuator control path to the milli actuator of the target head. In some configurations (described later), an additional DAC may be present in servo interface circuit 210 to drive the milli actuators during self-servo write mode using milli actuator control signal 246. Flex circuit 240 may receive micro actuator control signals 248, 250, 252, and 254 to electrically connect micro actuator DAC 216 and/or milli actuator DAC 214 in micro actuator control paths to the micro actuators of the target head(s).

Servo control logic 230 may generate the motor and actuator control signals for adjusting the positioning of the heads over the media surfaces. Servo control logic 230 may use a combination of hardware and software to receive position error signals 288 and 290 from channel 280 and generate digital VCM and actuator control signals in the form of digital adjustment values for changing the position of the respective motors or actuators. For example, servo control logic 230 may generate digital VCM control signal 236, milli actuator control signal 234, and micro actuator control signal 232. In some configurations, servo control logic 230 may also provide a control signal (not shown) for selecting the switch configuration for switches 218 and 220 and switching between date read/write mode and self-servo write mode.

Head banks 260 may include electronics, motors, and actuators for positioning the heads over the storage medium and generating read and write signals to interact with the storage medium. Each of suspension assemblies 262 may support a corresponding head 268 over a storage medium surface and be grossly positioned by the VCM rotating the head stack relative to the disk stack. Each suspension assembly 262 may include a number of dual or multi-stage actuators for increasingly fine positioning. For example, each suspension assembly 262 may include a milli actuator 264 capable of laterally adjusting the position of a portion of the suspension across an actuator range and a micro actuator 266 capable of laterally adjusting the position of head 268 proximate the distal end of the suspension. In some configurations, the milli actuator may be referred to as an suspension actuator (that positions a portion of the suspension), and the micro actuator may be referred to as a head actuator (that actuates the position of the head at the end of the suspension). As described above, servo interface circuit 210 may provide control signals to two or more actuators to control a target head or heads. For example, during data read/write operation, head 268.1 on suspension assembly 262.1 may be selected as the target head and actuator control signals may be sent to milli actuator 264.1 and micro actuator 266.1 or head 268.2 on suspension assembly 262.2 may be selected as the target head and actuator control signals may be sent to milli actuator 264.2 and micro actuator 266.2. During self-servo write mode, both heads 268.1 and 268.2 may be selected for parallel self-servo writing and actuator control signals may be sent in parallel to micro actuator 266.1 and 266.2.

Preamplifier circuits 270 may control and amplify read and write signals between channel 280 and heads 268. In some configurations, each head bank has a corresponding preamplifier circuit 270, such as preamplifier circuit 270.1 for the upper bank and preamplifier circuit 270.2 for the lower bank. Each preamplifier circuit 270 may be configured to provide write signals and read signals for a selected head in their head bank and connect the read and write paths to corresponding interfaces for the channel. In the configuration shown, heads 268 are TDMR heads comprising two read elements and one write element. Preamplifier circuits 270 and channel 280 are configured with corresponding read and write channels. For example, preamplifier circuit 270.1 includes two read channels 274 and 276 and one write channel 278 for connecting to corresponding interfaces 272 to channel 280 through flex circuit 240. Preamplifier circuit 270.2 also includes selective electrical connections to read channels 274 and 276 and write channel 278. Preamplifier circuits 270 may be configured to receive control signals from channel 280 and/or an associated controller to select which heads and corresponding connections to the read and write channels are active. During data read/write mode, only one preamplifier circuit 270 and selected head 268 may be active to provide the two read signals from the read elements on that head. During parallel self-servo write mode, each preamplifier may select a head and provide only one read signal (selecting between the two read elements on each head) such that the two read channels 274 and 276 receive a single read signal from each head and channel 280 may decouple the read signals to calculate separate PES values for the two heads in parallel.

In some configurations, additional controller logic may be used to select between data read/write mode and self-servo write mode for preamplifiers 270. For example, mode selection logic 282 may be in communication with channel 280 or an associated controller to receive head selection control signals 284 and send corresponding preamplifier control signals 286 to preamplifier circuits 270. A read/write control signal may be configured to selectively send preamplifier control signal 286 only to one preamplifier circuit at a time. A second control signal and corresponding switching may be provided by mode selection logic 282 to send head and element selection control information via preamplifier control signal 286 to both preamplifier circuits 270 in parallel.

In FIGS. 2C and 2D, another example configuration of a servo interface circuit 291 for use in control circuitry 200 is shown. FIG. 2C shows a configuration 202 for self-servo write operation mode and FIG. 2D shows a configuration 204 for data read/write operating mode. VCM DAC 212 and micro actuator DAC 216 may operate substantially as described above with regard to FIGS. 2A and 2B.

As shown in configuration 202, milli actuator DAC 214 may also operate substantially as described in FIG. 2B during self-servo writing and be connected at 220.1 to dual-phase driver 222 to generate the actuator control signals 226.3 and 226.4 for the micro actuator on the suspension of the second head. A third actuator DAC 292 (referred to as S-DAC 292) is configured to generate control signal for the milli actuators during parallel self-servo writing. S-DAC 292 may receive a third digital actuator control signal 293 from a servo controller, such as servo controller 230 in FIG. 2B and provide a control signal to control the milli actuators via 226.7 and via 226.8. Servo interface circuit 291 may include a digital signal processor (DSP) 295 and a demultiplexor 296. These components may be disabled or bypassed during parallel self-servo writing. For example, demultiplexor 296 may include or connect to a switch 297 configured to disconnect demultiplexor 296 from outer channel 294.1 and inner channel 294.2 during self-servo write operations. Similarly, DSP 295 may be disabled at the same time. Without the operation of demultiplexor 296, S-DAC 292 may control the milli actuators for both head banks and the suspensions supporting the heads of the target write pair. In some configurations, the milli actuators driving the head pairs for parallel servo-write are connected to move in opposite directions. Hence the milli actuator control signal 226 will drive the heads to move in opposite directions, allowing for coupled position control with range limited by the milli actuator stroke. Configuration 202 may include additional pins for connecting to electrically adjacent components. In some configuration, switches 220 and 297 may only be switched between modes when both the micro actuators and milli actuators are disabled, such as when the heads are parked between operations.

As shown in configuration 204, during data read/write operations, DSP 295 and demultiplexor 296 may be activated. For example, switch 297 may connect demultiplexor 296 to inner channel 294.2 and disconnect S-DAC 292 from inner channel 294.2. DSP 295 may modify the digital control signal 234 to drive S-DAC 292 to provide a second leg of the actuator control signal to facilitate the milli actuator to outer channel 294.1 switch process. The control signals generated by milli actuator DAC 214 and S-DAC 292 may each contribute to the control of the milli actuator for the target head during read/write operations, by respectively generating milli actuator control signals 226.7 for the outer heads and 226.8 for the rest of the heads.

Figure 3:
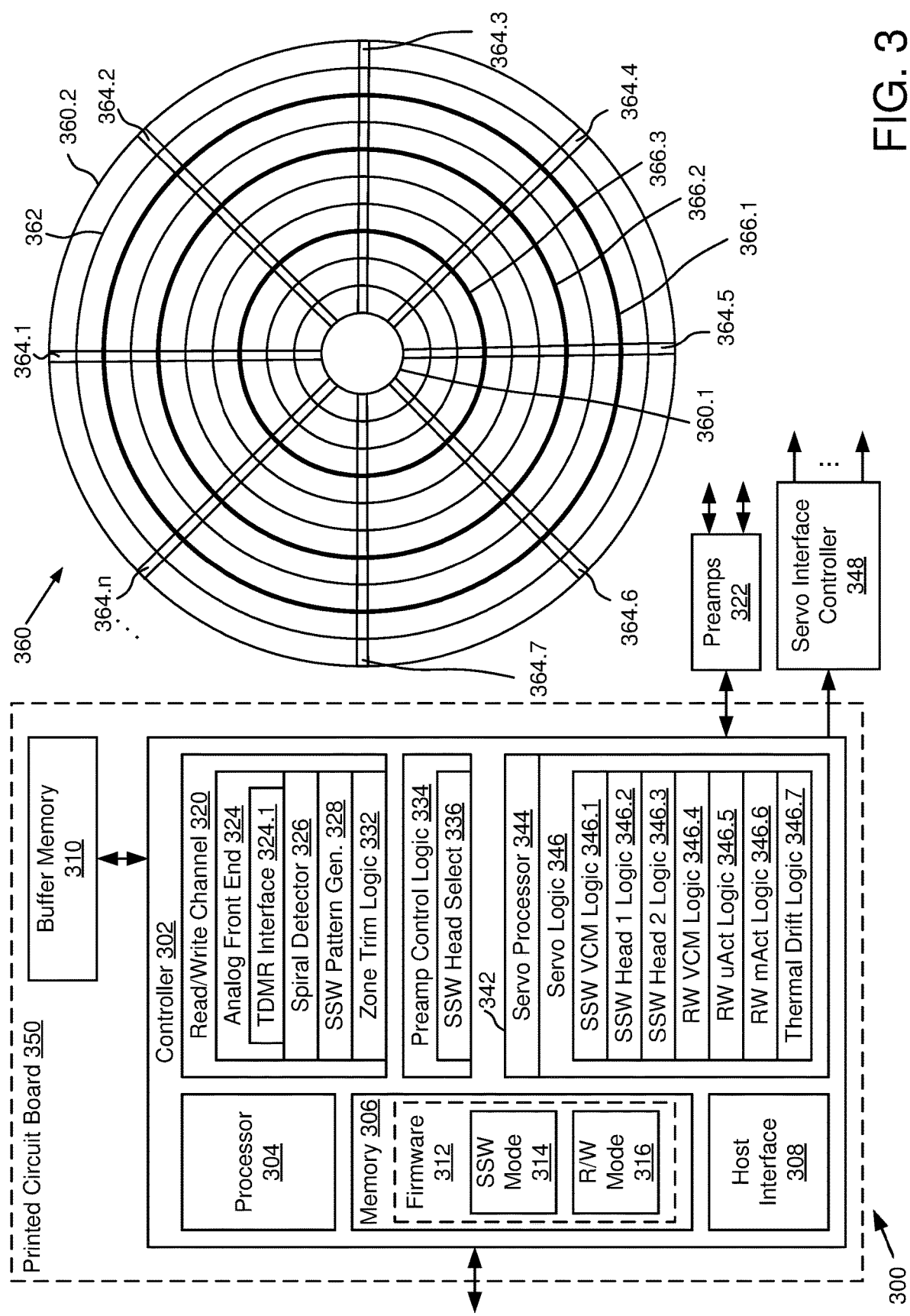
FIG. 3 is a block diagram of a configuration of data storage device including control circuitry and a storage medium format written using self-servo write.

FIG. 3 shows a portion of example control circuitry 300 and a storage medium 360 for a data storage device, such as an HDD. In the example shown, control circuitry 300 may include one or more hardware controllers. Controller 302 may comprise a storage device controller configured to receive host storage commands, process storage operations for writing, reading, and managing data stored to non-volatile storage media in the disk drive, such as the magnetic media disk of storage medium 360 or FIGS. 1A, 1B, and/or 1C. In some embodiments, controller 302 may correspond to a separate host interface and read/write path to a subset of disk surfaces in a data storage device with multiple controllers. In some embodiments, controller 302 may be configured to manage servo, read/write, and self-servo writing operations for one or more actuators, heads, and corresponding writer and reader elements.

Controller 302 may comprise a processor 304, a memory 306, a host interface 308, and access to a buffer memory 310. Controllers 302 may also comprise a read/write channel 320, and a servo controller 342 including a servo processor 344 and servo logic 346. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. Controller 302 may include physical and electrical interfaces for connecting to buffer memory 310, a power source (not shown), preamp 322, servo interface controller 348, other controllers, and/or other circuitry components. In some embodiments, the components of controller 302 may be interconnected by a bus that includes one or more conductors that permit communication among the components. For example, processor 304, memory 306, host interface 308, read/write channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. Processor 304 may include multiple hardware processors configured to operate independently or in combination (such as multiple processor cores executing threaded operations) to execute one or more instruction sets. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store controller firmware 312, comprising instructions that include one or more modules or sub-modules for specific data storage device operations and processor 304 may execute those instructions, including controlling communication with other components, such as host interface 308, buffer memory 310, read/write channel 320, and servo controller 342.

Controller firmware 312 may include firmware for operating control circuitry 300 and the corresponding data storage device in different operating modes. For example, controller firmware 312 may support a self-servo write mode 314 for writing servo patterns to the storage medium using control circuitry 300. In some configurations, self-servo write mode 314 may be initiated in a data storage device after assembly and may enable writing a desired servo pattern similar to that shown for storage medium 360. Self-servo write mode 314 may start from one or more blank storage medium surfaces and/or a surface previously written with a spiral reference pattern. In some configurations, self-servo write mode 314 may include a series of iteratively written spiral reference patterns and the writing and rewriting of servo sectors, such as servo sectors 364, until a desired servo pattern and corresponding quality metrics are achieved. After a desired servo pattern and servo performance level is achieved, controller firmware 312 may end self-servo write mode 314 and initiate a data read/write mode 316 to write and read data in data tracks defined relative to the servo pattern. For example, data read/write mode 316 may be the production configuration of control circuitry 300 used for the remaining configuration and testing of the data storage device, as well as during its production life in field operation.

An example servo format as produced by self-servo write mode 314 for use during data read write mode 316 is shown with reference to storage medium surface 360. The data track format may be configured in relation to the servo format, but may not include one-to-one mapping of data tracks to servo tracks. For example, the servo format may define concentric servo tracks 362 defined by servo sectors 364.1-364.n. Servo sectors 364 and corresponding servo tracks 362 may have varying data rates selected to more fully utilize the different track lengths and speeds from the inner diameter (ID) 360.1 to outer diameter (OD) 360.2 of the spinning disk. Data tracks may be configured to overlay the servo tracks with data track formatting as either concentric tracks, where each track forms a distinct ring with a starting and ending point on the same circumference, or continuous tracks, where the tracks form a continuous spiral with start and end positions that are not on the same circumference, and may support different track densities and track zones relative to the servo format. In some configurations, servo tracks 362 may be organized into zones of varying track density or frequency. A servo zone may refer to a set of concentrically adjacent servo tracks with a shared nominal track density and/or frequency that is similar to one another and different from the adjacent zones. Each adjacent pair of servo zoned may also define a zone boundary 366 between them. Zone boundaries may require special operations to manage servo writing and/or servo positioning when the zone boundaries are crossed. For example, positioning information, timing, and channel settings may change when zone boundaries are crossed. Track configuration may be stored in a set of media configuration parameters for the servo and data track formats for use by other components of the system, such as read/write channel 320 and servo controller 342.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe), universal serial bus (USB), etc., for connecting host interface 308 to a peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Read/write channel 320 may provide the analog write signal to and receive the analog read signal from preamps 322, which control and amplify signals to and from the heads. During data read/write operating mode 316, binary data for recording to the storage medium may be received by read/write channel 320 from controller firmware 312 and decoded data from read/write channel 320 may be passed to controller firmware 312 and/or directed to buffer memory 310 for communication to the host. Read/write channel 320 may also separate the servo read signal(s) from the data read signal to support servo controller 342.

In some configurations, read/write channel 320 may include an analog front end 324 configured to receive the analog read signal from preamp 322 and convert it into a digital read signal for processing by other components of read/write channel 320. For example, analog front end 324 may include an analog-digital converter (ADC), timing circuit, and one or more filters, equalizers, and/or other signal conditioning components for generating the digital read data. In some configurations, analog front end 324 and/or other components of read/write channel 320 may support operations of servo controller 342. For example, the read signal received through preamp 322 and analog front end 324 may provide the servo read signal based on the read head response generated when the head passes over servo sectors 364 during self-servo write, track seek, track follow, and other servo operations. In some configurations, read/write channel 320 and analog front end 324 may be configured for TDMR read/write operation and interface with TDMR heads through preamps 322. For example, each TDMR head may include a single writer element and two reader elements and, during TDMR read/write operation, read/write channel 320 may receive the two read signals from the head in parallel for reading servo and user data. Analog front end 324 may be configured with a TDMR interface 324.1 that includes two read channel inputs and one write channel output to receive and send data to a selected head. In self-servo write mode, the two read channels may be decoupled to generate separate read signals from two heads in parallel and provide separate servo read signals and corresponding position error signals in servo controller 342.

In some configurations, read/write channel 320, servo controller 342, and/or controller 302 may include self-servo writing functions for operation during self-servo writing mode 314. These functions may be configured in firmware running on controller 302 and/or its subcomponents. For example, reference spiral detector 326 may include logic for generating position information based on one or more spiral reference patterns previously written to the storage medium surface. The magnetic transitions and information contained in spiral reference patterns may not be similar to production servo patterns written in servo sectors 364 or user data patterns from data tracks and different position information and related position error signals may be used. Reference spiral detector 326 may be configured with logic to process the received read signals from target heads to generate position information and/or PES.

An SSW pattern generator 328 may generate write signals to target heads for writing the production servo sectors and/or improved spiral reference patterns. For example, during self-servo writing mode, read/write channel 320 may write servo sectors to the storage medium surface with the write elements of two heads in parallel. The servo pattern, including frequencies, servo track identifiers, burst patterns, and other data patterns, may be defined for the data storage device in firmware 312 and SSW pattern generator 328 may generate the corresponding write signal through preamps 322 and the target heads with position and timing based on SSW servo feedback. During parallel self-servo write, read/write channel 320 and/or servo controller 342 may determine head positions relative to a previously written self-servo write reference spiral and, as long as the head position is calculated to be within an acceptable error tolerance value of that reference spiral, write a next track of the servo pattern for the product using the active heads and corresponding storage medium surfaces.

Zone trim logic 332 may include special functions for addressing zone boundaries 366 and overwrite concerns that may result from writing over prior servo patterns during self-servo write. For example, rework of production servo patterns may result in residual patterns from prior iterations where a new pattern does not completely overwrite the prior pattern, particularly where exact registration may be difficult given the changing thermal characteristics and varying thermal compensation values. Subsequent servo zones may be written slightly shifted towards the ID and/or the OD than their target position. Therefore, parallel fill on the same surface for a second time may result in residual servo tracks from the prior run that would not be overwritten as outside the range of the new pattern. These residual tracks would appear at the zone boundaries or the ID and OD edges of each servo zone. Such duplicate tracks could confuse the servo controller during read/write mode. Zone trim logic 332 may include logic to write an erase band at the ID and OD edges of a servo sector write to assure that no residual pattern remains. The width of the erase band may be based on the maximum run-to-run thermal drift to assure that even a worse case change in thermal state between self-servo writes does not result in residual servo data and the unnecessary servo patterns are trimmed.

Preamp control logic 334 may include logic for selecting the target head or heads through preamps 322. For example, during read/write operating mode 316, a control signal may be sent to the preamplifier for the head bank that includes the target head and indicate the target head that will receive and generate read/write signals for the read/write operation. For example, preamp control logic 334 may generate one or more serial enable control signals to activate one or both preamplifiers. During self-servo write mode 314 using parallel servo write, preamp control logic 334 may be configured to send SSW head select signals 336 to two preamps in parallel. For example, the read/write selection control signal may be supplemented by a split signal and selection logic to direct the head selection control signal to both preamps.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. Servo controller 342 may also operate during self-servo write mode 314 to provide position control relative to previously written spiral reference patterns for writing servo sectors 364. In some embodiments, servo controller 342 may include servo processor 344 and servo logic 346 (stored in a servo memory). For example, servo processor 344 may be a dedicated processor circuit and servo logic 346 may be firmware stored in RAM associated with the dedicated processor to provide dedicated computing resources for managing the servo functions. Servo controller 342 may receive servo read signals read from the disk surface using preamp 322 and provided to servo controller 342 through channel 320. Servo controller 342 may provide servo control signals to servo interface controller 348 for providing control signals to multiple motors and/or actuators. For example, servo controller 342 may provide control signals for a VCM and at least two actuators as described above with regard to FIG. 2.

In some configurations, servo logic 346 may include logic for operating differently between self-servo write mode 314 and read/write operating mode 316. For example, during self-servo write mode 314, servo logic 346 may implement SSW VCM logic 346.1, SSW head 1 logic 346.2, and SSW head 2 logic 346.3. Each head may be configured to track the spiral reference pattern on its corresponding disk surface for a track per inch (TPI) reference, noting that the different heads/disks may be configured for different target TPI values. SSW VCM logic 346.1 may include logic for determining VCM position adjustments based on the two PES received from the different heads. For example, VCM logic 346.1 may use one of the two heads as a master head and provide gross positioning to track on the master head. In another example, VCM logic 346.1 may use an average of the PES from the two heads. SSW head 1 logic 346.2 and SSW head 2 logic 346.2 may use the milli and micro actuator capabilities and corresponding direct current (DC) adjustment values to provide DC drift compensation up to the stroke distance of each milli actuator and micro actuator. SSW head 1 logic 346.2 and SSW head 2 logic 346.3 may include logic for using the PES from the respective heads and adjustments being made by VCM logic 346.1 to determine the position adjustments to be made to their respective actuators. For example, the micro actuator for each head 346.5 may receive a position compensation signal based on offsetting that head's PES based on the anticipated correction to the VCM position. In some configurations, the master or leading head may provide the DC and AC position control and the other head may follow using AC position control. In some configurations, SSW head 1 logic 346.2 and SSW head 2 logic 346.3 may also include logic for managing the relationship between their respective positions. For example, if the stroke distance limit of one of the actuators is reached, then the leading head may suspend writing for a revolution to allow the lagging head to catch up and get back within the range of its actuator. In some configurations, DC may be rejected on both heads simultaneously. For example, N % of track DC PES from one head may be subtracted from the PES of the other head to preserve equal and opposite DC PES on the two heads. In other examples, the milli actuator for each head 346.6 may receive a low frequency, including DC, position compensation signal to remove the two heads' PES offset based on half of the anticipated correction. The heads on the two banks move in opposite directions by half of the anticipated amount, thus forming a combined amount of offset removal.

Thermal drift logic 346.7 may include compensation logic for adjusting the positioning loop during self-servo write to compensate for relative changes in position between the parallel heads caused by thermal changes during self-servo write operations. While parallel filling servo patterns on two disk surfaces, the two heads and/or the reference spirals can slowly drift apart from each other due to thermal expansion from the head stack and/or disk stack and motor. Thermal drift logic 346.7 may compensate for the difference in head position from a nominal (start or cold) value to increasing compensation values as the device heats up by injecting the compensation value into the position control for the actuators. If the heads drift too far apart, the milli actuators and microactuators may not be able to compensate for the head position difference due to the limited actuator stroke distance. In some configurations, thermal drift logic 346.7 may ignore a portion of the PES and vary the amount ignored (compensation value) gradually over the SSW operations. So that the impact on track squeeze may be limited, the compensation value may vary slowly and, at each radial position, the compensation value may be a direct current (DC) or constant value referred to as PES DC bleed-out. During parallel fill, the radial location of any given servo track may depend on the thermal state and thermal history of the drive, as determined by the PES thermal compensation value.

Figure 4:
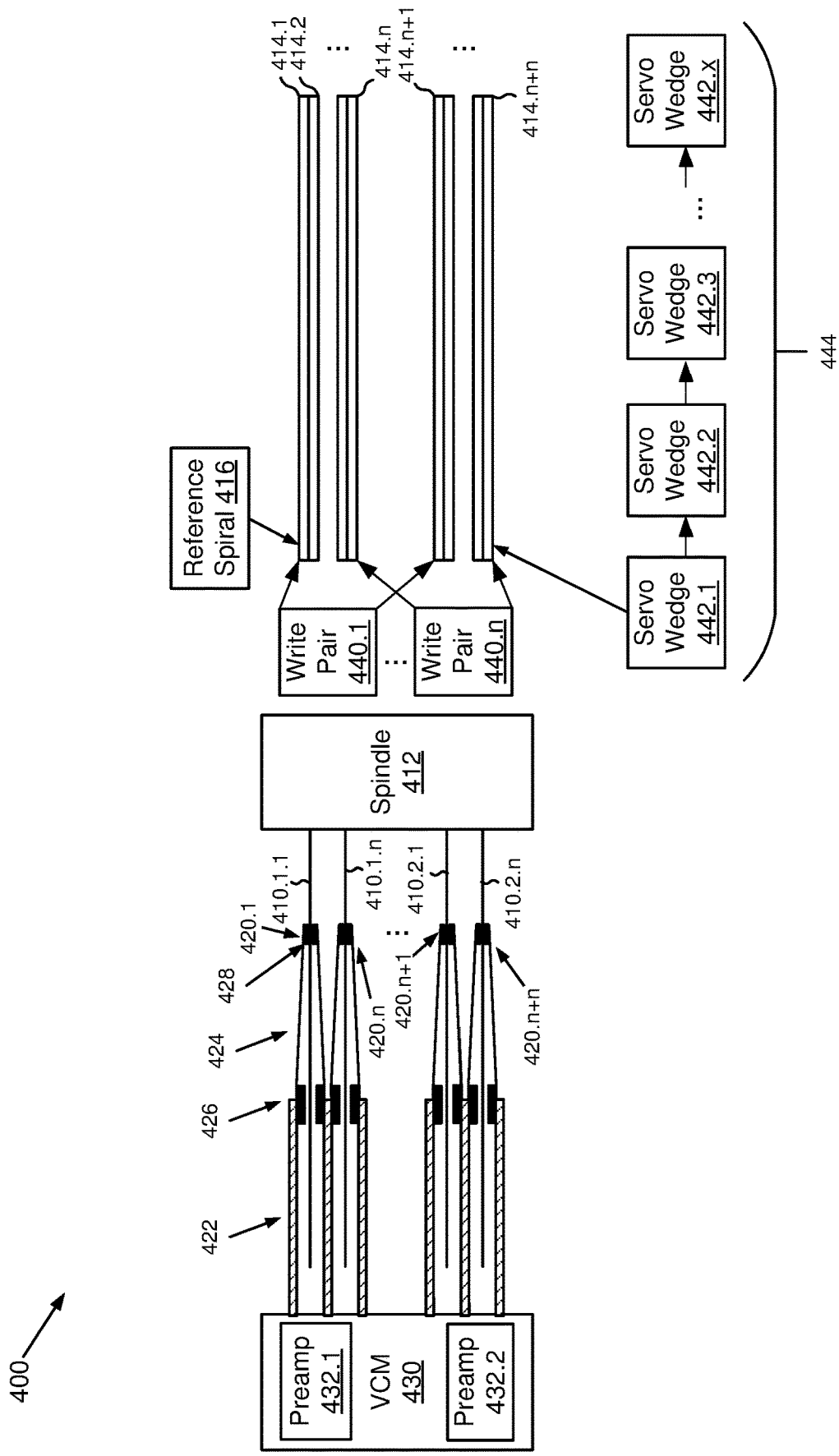
FIG. 4 is a diagram showing parallel self-servo writing using two head banks with corresponding preamplifier circuits.

FIG. 4 shows a parallel self-servo writing process 400 for a data storage device having two head banks and corresponding preamplifier circuits. A storage media stack includes disks 410 arranged in two banks around a spindle 412. The upper bank includes disk surfaces 410.1.1-410.1.$n$ and the lower bank includes disk surfaces 410.2.1-410.2.$n$. Each disk includes two storage medium surfaces 414 for magnetically recording data on the opposing (upper and lower) surfaces of the disk. A head 420 is actuated over each surface and suspended by a corresponding suspension 424. Each suspension 424 may include a fixed portion attached to arm 422 and a flexible portion extending toward the corresponding disk surface. In some configurations, an actuator 426, such as a piezoelectric milli actuator may be positioned at the junction of the fixed portion of the suspension portion and operable for lateral positioning of suspension 424. In some configurations, a second actuator 428, such as a piezoelectric micro actuator, may be positioned proximate head 420 at the distal end of suspension portion 424 and operable for further lateral positioning. Due to both the size of the actuators and their relative distances from the head, arm actuator 426 that moves suspension portion 424 of arm 422 may have a greater stroke distance or range than head actuator 428 adjacent head 420, but head actuator 428 may have greater precision for fine positioning of the read/write elements over the desired location on the disk. Additionally, in SSW mode, the arm actuator 426 for the parallel write head banks can only be controlled to move in opposite directions, making it useful for correcting the DC and low-frequency offsets between the two heads. The head actuator 428 on the other hand, having a more limited move range, is individually controlled by bank, making it capable of correcting not only the lower frequency errors, including offsets, but also the higher frequency errors for accurate servo pattern placement at the desirable place. Heads 420 and corresponding suspension 424 are similarly arranged in banks. The upper bank may include heads 420.1-420.$n$ and their corresponding arms 422 and the lower bank may include heads 420.$n$+1-420.$n$+n. Each bank of heads is electrically connected to a corresponding preamplifier circuit, such as preamp 432.1 for the upper head bank and preamp 432.2 for the lower head bank.

During parallel self-servo write, the control circuitry uses reference spiral 416 from the storage medium surface to provide position information for writing the servo sectors or servo wedges. Reference spiral 416 may be a previously written spiral reference pattern and be present on each disk surface when writing of the servo sectors is initiated. Heads 420.1-420.$n$ may be used to write the servo sectors on the upper bank of disks in parallel with heads 420.$n$+1-420.$n$+n writing the servo sectors on the lower bank. Due to the mechanics of the disk stack and the head stack, it may be preferable to parallel write with head pairs that minimize the vertical distance between heads. In some configurations, write pairs 440.1-440.$n$ are selected to pair the writing with heads/surfaces in the same sequential position in each head bank. For example, head 420.1 writing to surface 414.1 would be paired with head 420.$n$+1 writing to surface 414.$n$+1 as write pair 440.1. Each surface may be written sequentially down to head 420.$n$ writing to surface 414.$n$ and head 420.$n$+n writing to surface 414.$n$+n as write pair 440.$n$. In some configurations, write pairs 440 may be selected in a different order, rather than top to bottom. Other pairings are also possible, such as nearest pairs to farthest pairs, or parings of top surface heads from one bank with bottom surface heads from the other bank. As each pair is selected, servo wedges 442.1-442.$x$ are written in sequence on both disk surfaces at the same time. In some configurations, when wiring preamps to their respective head banks, neighboring heads may be wired to alternative preamps for minimizing read/write cross-talk and so that write pairs for parallel fill are two heads away, making them closer, with less cross-head motion.

Figure 5A:
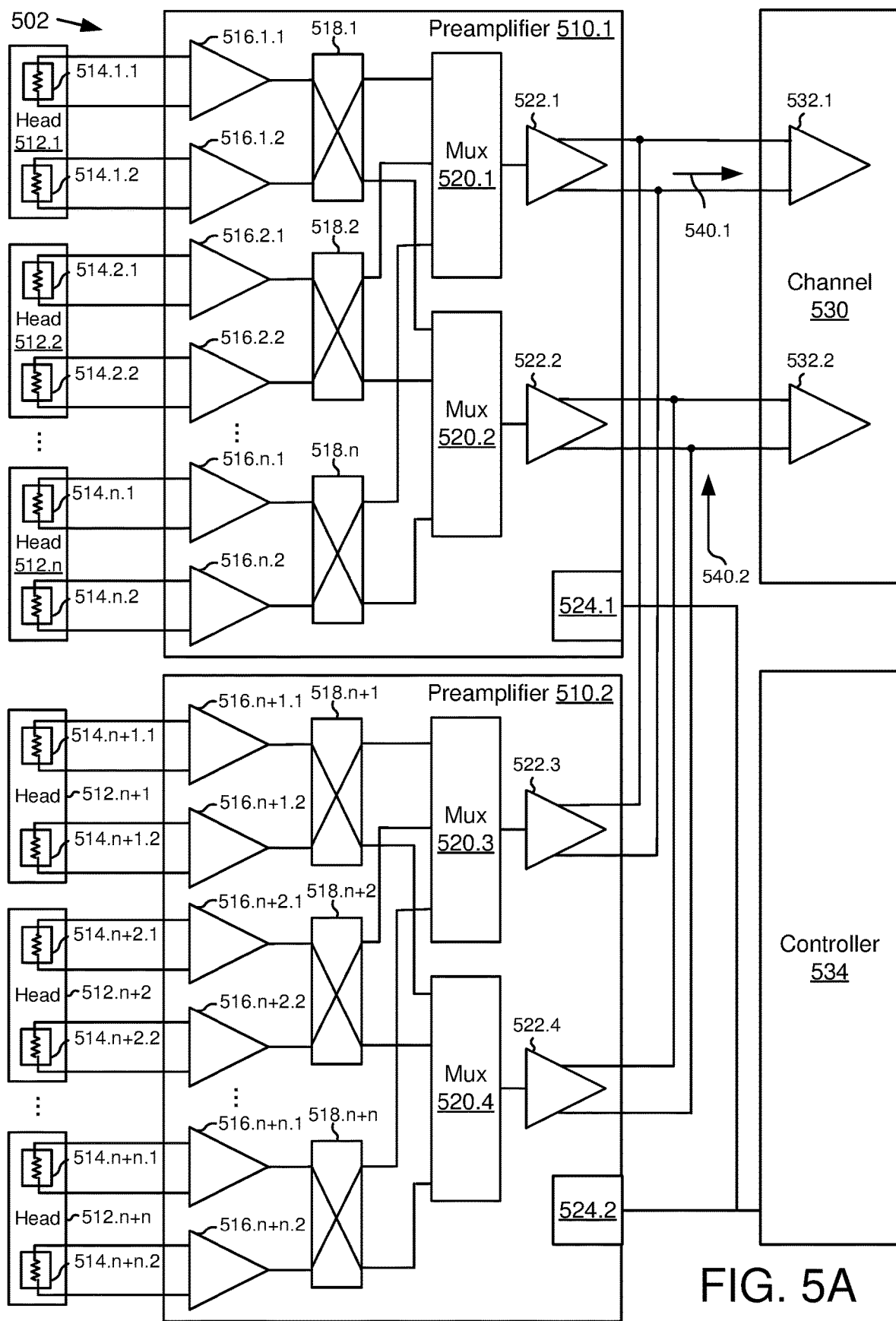
FIGS. 5A and 5B are example preamplifier configurations for parallel self-servo write using TDMR heads.

As shown in FIGS. 5A-5D, a number of example preamplifier configurations and adjacent circuitry may be used for parallel self-servo writing. In FIG. 5A, an example configuration 502 includes preamplifier circuits 510.1 and 510.2. Preamplifier circuit 510.1 is electrically connected to a bank of TDMR heads 512.1-512.$n$. Each TDMR head 512 includes two read elements 514 that are electrically connected to the input interfaces of corresponding sensor amplifiers 516. For example, read elements 514.1.1 and 514.1.2 are connected to sensor amplifier 516.1.1 and 516.1.2 respectively, read elements 514.2.1 and 514.2.2 are connected to sensor amplifier 516.2.1 and 516.2.2 respectively, and read elements 514.3.1 and 514.3.2 are connected to sensor amplifier 516.$n$.1 and 516.$n$.2 respectively. Preamplifier circuit 510.2 is electrically connected to another bank of TDMR heads 512.$n$+1-512.$n$+n. Read elements 514.$n$+1.1 and 514.$n$+1.2 are connected to sensor amplifier 516.$n$+1.1 and 516.$n$+n.2 respectively, read elements 514.$n$+2.1 and 514.$n$+2.2 are connected to sensor amplifier 516.$n$+2.1 and 516.$n$+2.2 respectively, and read elements 514.$n$+n.1 and 514.$n$+n.2 are connected to sensor amplifier 516.$n$+n.1 and 516.$n$+n.2 respectively.

In preamplifier circuits 510.1 and 510.2, sensor amplifiers 516 are connected in pairs to A and B swap circuits 518 configured to swap the amplified read signals from the corresponding read elements to connect to opposite multiplexors 520. For example, amplified read signals from sensor amplifiers 516.1.1 and 516.1.2 are swapped through swap circuit 518.1 to connect the read signal from sensor amplifier 516.1.1 to multiplexor 520.2 and the read signal from sensor amplifier 516.1.2 to multiplexor 520.1. Similar configurations operate for sensor amplifiers 516.2.1 and 516.2.2 through swap circuit 518.2 and sensor amplifiers 516.$n$.1 and 516.$n$.2 through swap circuit 518.$n$. Preamplifier circuit 510.2 is configured similarly for sensor amplifiers 516.$n$+1.1 and 516.$n$+1.2 through swap circuit 518.$n$+1, sensor amplifiers 516.$n$+2.1 and 516.$n$+2.2 through swap circuit 518.$n$+2, and sensor amplifiers 516.$n$+n. 1 and 516.$n$+n.2 through swap circuit 518.$n$+n.

Multiplexors 520 may be circuits configured to select among amplified read signals to selectively connect them to read drivers 522.1 that interface with read channels 532 of channel 530. In some configurations, multiplexors 520 may select the target head and corresponding read sensors based on a control signal received at corresponding control signal inputs 524. During data read/write operation, the pair of read signals from the pair of read elements in the target head may be selected by multiplexor 520.1 and 520.2 and passed to read drivers 522.1 and 522.2 respectively. During self-servo write operation, only one of multiplexors 520.1 and 520.2 may be enabled and select a single read signal from the target head to provide to one of read driver 522.1 or 522.2. Preamplifier 510.2 may be similarly configured such that preamplifiers 510.1 and 510.2 may be activated alternatingly as needed for reading from both read elements of a target head in their head bank. During self-servo write operation, only one of multiplexors 520.4 or 520.3 may be enabled and select a single read signal from the parallel target head to provide to one of read drivers 522.4 or 522.3. The corresponding read driver 522 associated with the active multiplexor may provide the amplified read signal through an interface to read channel inputs 532 in channel 530. In the example shown, during a self-servo write operation, multiplexor 520.1 provides the amplified read signal from a target head connected to preamplifier 510.1 to read driver 522.1 to provide a read signal 540.1 to read channel input 532.1, and multiplexor 520.4 provides the amplified read signal from a target head connected to preamplifier 510.2 to read driver 522.4 to provide a parallel read signal 540.2 to read channel input 532.2.

During self-servo write operation, read channel 530 may be configured to decouple the received read signals 540.1 and 540.2 and process them separately to determine their respective servo position information and PES. For example, the analog front end of channel 530 may include separate variable gain amplifiers (VGA) configured to receive the pair of read signals through read channel inputs 532.1 and 532.2 and direct them through separate read processing channels to extract servo information from the respective read signals. In some configurations, read channel 530 may be configured similarly to read/write channel 320 in FIG. 3.

In some configurations, head selection and preamplifier control may be managed by controller 534, such as a hardware controller configured similarly to controller 302 in FIG. 3. Controller 534 may generate preamplifier control signals and send them to control signal inputs 524.1 and 524.2 for controlling preamplifier circuits 510.1 and 510.2 respectively. During read/write operations, controller 534 may send a control signal to the active preamplifier connected to the target head for the read write operation and the lack of a control signal to the other preamplifier may effectively disable it for read/write operations when the other preamplifier is active. During parallel self-servo write operations, both preamplifiers 510 may need to be active and receive parameters for selecting the target head, read sensor, and read path (multiplexor to read driver to read channel input). For example, controller 534 may be configured to generate a pair of preamplifier control signals to send simultaneously to control signal inputs 524.1 and 524.2 to set the corresponding preamplifier parameters, though they may be different for each preamplifier. In some configurations, controller 534 may include native logic for generating the parallel control signals for parallel control of preamplifier circuits 510.1 and 510.2 during self-servo write operation.

Figure 5B:
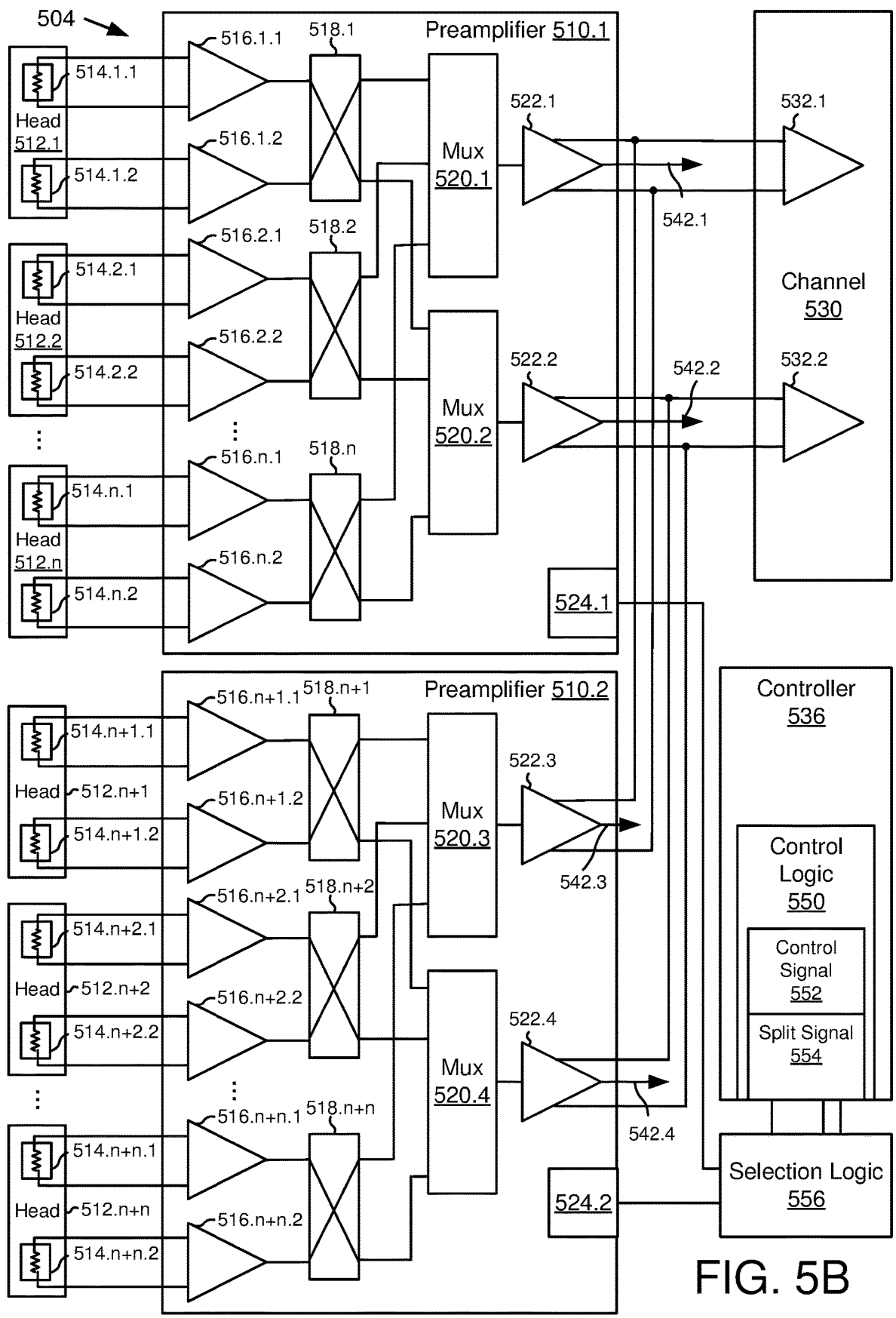

FIG. 5B shows an alternative example of configuration 504 using preamplifier circuits 510.1 and 510.2. Preamplifier circuits 510.1 and 510.2, their corresponding heads 512, and channel 530 are configured as described for FIG. 5A. In this example, preamplifier circuits 510.1 and 510.2 may be operating in read/write operating mode. When a target head is selected in the head bank including heads 512.1-512.n, multiplexors 520.1 and 520.2 may select the amplified read signals from the pair of read sensors on that head and direct them to read drivers 522.1 and 522.2. TDMR read signals 542.1 and 542.2 may be sent to channel inputs 532.1 and 532.2 and the corresponding coupled TDMR read channels for processing position information (and stored data) from those signals. When a target head is selected in the head bank including heads 512.n+1-512.n+n, multiplexors 520.3 and 520.4 may select the amplified read signals from the pair of read sensors on that head and direct them to read drivers 522.3 and 522.4. TDMR read signals 542.3 and 542.4 may be sent to channel inputs 532.1 and 532.2 and the corresponding coupled TDMR read channels for processing position information (and stored data) from those signals.

In configuration 504, an alternative controller 536 is shown that does not include native generation of parallel preamplifier control signals to control signal inputs 524.1 and 524.2. Controller 536 may otherwise be configured similarly to controller 302 in FIG. 3. Controller 536 may include control logic 550 that may include firmware instructions for selectively initiating control signal generator 552 to generate the data read/write operation control signal that is selectively sent to control signal input 524.1 (when preamplifier 510.1 is active) or control signal input 524.2 (when preamplifier 510.2 is active). Control logic 550 may include additional split signal generator 554 to generate additional split signals to initialize selection logic 556 to generate parallel preamplifier control signals to control signal inputs 524.1 and 524.2. Further description of an example selection logic circuit 580 is provided below with reference to FIG. 5D.

Figure 5C:
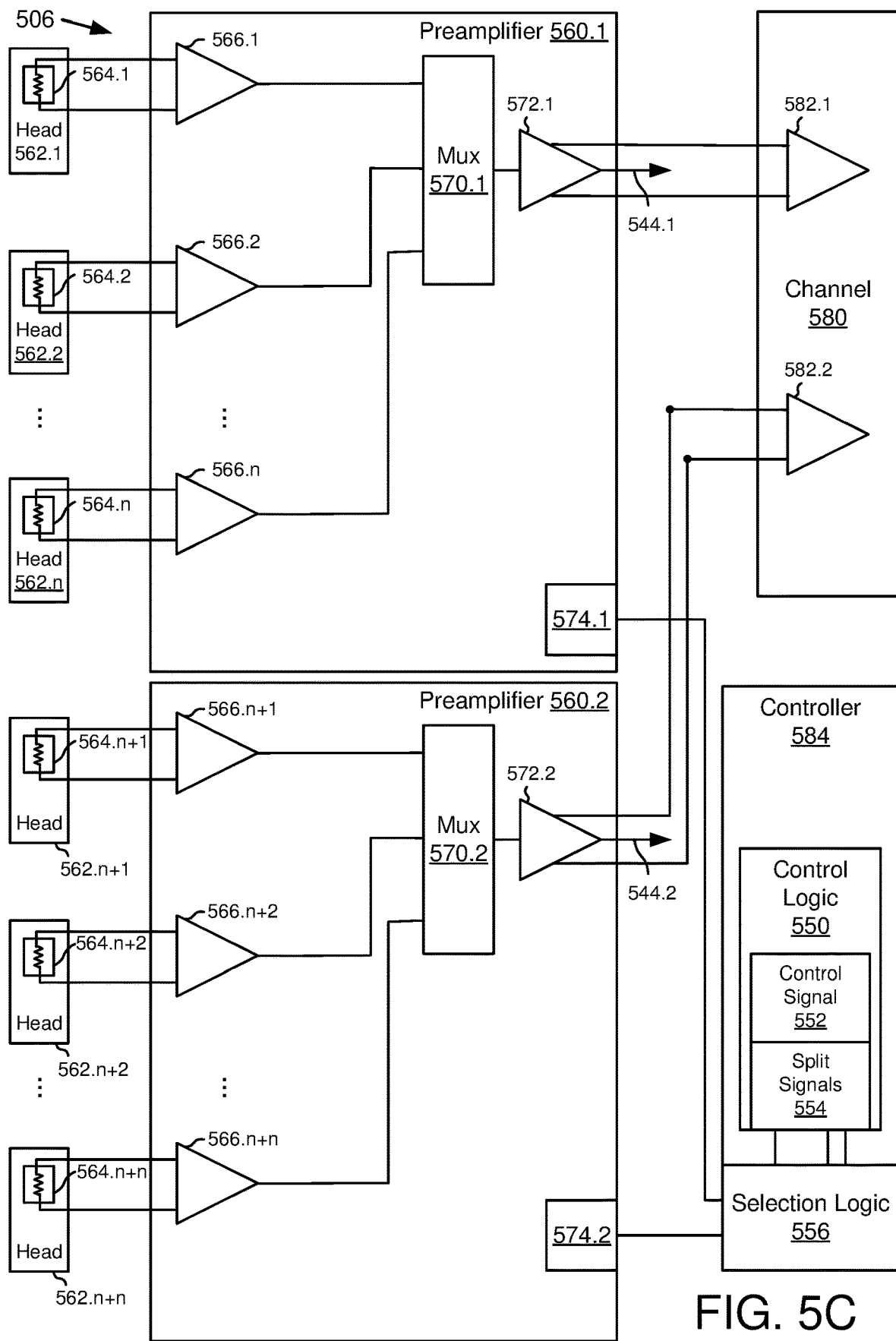
FIG. 5C is an example preamplifier configuration for parallel self-servo write using single reader heads.

FIG. 5C shows an alternative example configuration 506 using non-TDMR heads and preamplifiers for parallel self-servo write. Preamplifier circuits 560.1 and 560.2 are configured with a single sensor amplifier 566 to the single read sensor 564 on each head 562. For example, preamplifier circuit 560.1 supports a head bank including heads 562.1-562.n and receives read signals from corresponding read sensors 564.1-564.n through sensor amplifiers 566.1-566.n. Preamplifier circuit 560.2 supports another head bank that includes heads 562.n+1-562.n+n and receives read signals from corresponding read sensors 564.n+1-564.n+n through sensor amplifiers 566.n+n-566.n+n. Preamplifier circuits 560.1 and 560.2 each include only a single multiplexor 570 and read driver 572 for selecting and providing the read signal from the target head to a read channel input 582 of channel 580. For example, each sensor amplifier 566.1-566.n connects to multiplexor 570.1 to selective connection to read driver 572.1 and each sensor amplifier 566.n+1-566.n+n connects to multiplexor 570.2 to selectively connect to read driver 572.2. Preamplifier circuits 560.1 and 560.2 may also include control signal inputs 574.1 and 574.2 respectively for receiving preamplifier control signals to select the active preamplifier and head for read/write operations and activate both preamps and select target heads for parallel self-servo write. During read/write operating mode, read drivers 572.1 and 572.2 may alternatingly send read signals 544.1 and 544.2 to corresponding read channel inputs 582.1 and 582.2 for processing through a corresponding read channel. During parallel self-servo write mode, read drivers 572.1 and 572.2 may send read signals 544.1 and 544.2 in parallel to corresponding read channel inputs 582.1 and 582.2 for processing through decoupled read channels for extracting position information. Additional traces for the parallel read signals may be provided on the flex circuit (not shown) between read drivers 572 and read channel inputs 582.

In configuration 506, channel 580 includes separate read channel inputs 582.1 and 582.2, similar to the TDMR read channels in FIGS. 5A and 5B. Controller 584 may be configured similarly to controller 536 in FIG. 5B and include similar control logic 550 interfacing with selection logic 556 for controlling the two preamplifier modes through control signal inputs 574.1 and 574.2. We note here that configuration 506 is the non-TDMR version of configuration 504. The non-TDMR version of configuration of 502 is omitted here for brevity. One can change controller 584 in FIG. 5C with a controller like 534 to establish the non-TDMR version of configuration 502.

Figure 5D:
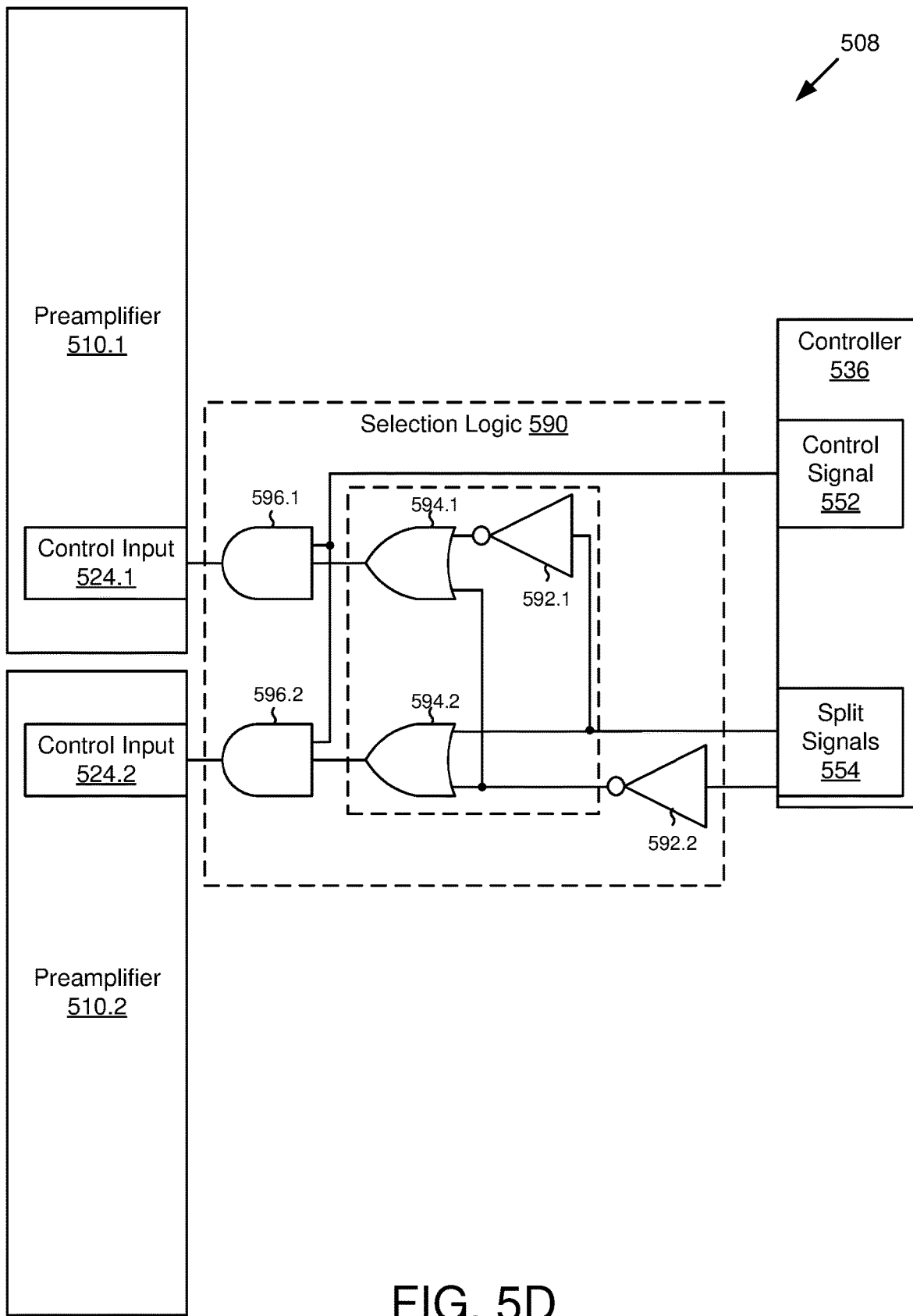
FIG. 5D is example selection logic for controlling preamplifier circuits to switch between self-servo write mode and read/write operating mode.

FIG. 5D shows an example selection logic circuit 590, such as may be used in configurations 504 and 506. The example configuration 508 is in the context of a configuration similar to configuration 504. Preamplifier circuits 510.1 and 510.2 are controlled through corresponding control signal inputs 524.1 and 524.2. Controller 536 includes control signal generator 552 and split signals generator 554. In the configuration shown, control signal generator 552 generates a read/write operation (single active preamplifier and head) control signal, such as a serial enable control signal, and provides it into selection logic 580, and split signals generator 554 may generate a pair of control signals for splitting the preamplifier control signal and providing selected control signals to the respective control signal inputs 524.1 and 524.2 in parallel. For example, the pair of signals generated by split signals generator 554 may include a head selection signal for preamplifier circuit 510.2, such as a second serial enable control signal, and a split signal selection signal to direct the control signal from control signal 552 to preamplifier circuit 510.1 in parallel. The control signals generated by control signal generator 552 and split signals generator 554 may be received by selection logic 580. In some configurations, selection logic circuit 590 may include hardware logic added to controller 536 or be provided as a separate device or portion of the flex circuit between controller 536 and preamplifier circuits 510.1 and 510.2.

Selection logic circuit 590 may comprise a pair of not gates 592.1 and 592.2 for the control signals from split signals generator 554. Not gates 592 may control the selection of control signals sent to or gates 594.1 and 594.2. Or gate 594.1 may evaluate the pair of not gate signals from 592.1 and 592.2 and or gate 594.2 may evaluate the selection signal for preamplifier circuit 510.2 versus the signal from not gate 592.2. And gates 596.1 and 596.2 may determine the control signals selectively sent to control signal inputs 524.1 and 524.2 respectively. And gates 596.1 and 596.2 may provide the single preamplifier/head selection control signal from control signal generator 552 during read/write operations or provide modified control signals based on or gates 594.1 and 594.2 respectively during parallel self-servo write operation. Other configurations of selection logic circuit 590 are possible.

Figure 6A:
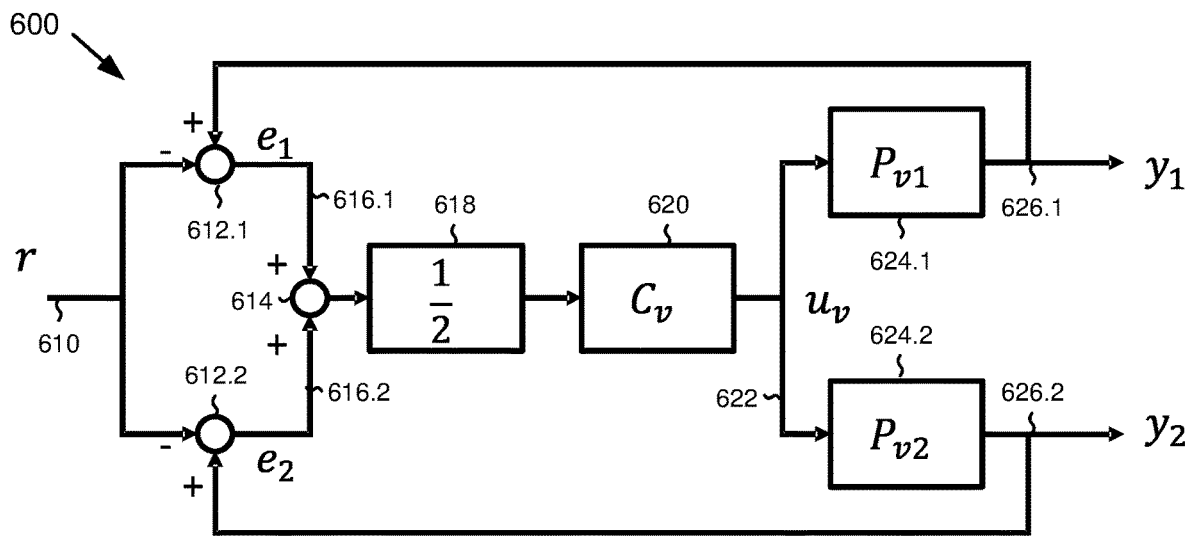
FIGS. 6A and 6B are example logic for determining servo control signals for parallel self-servo writing.

FIG. 6A shows example VCM compensator logic 600 that may determine the gross VCM position adjustment 622 based on per head position measurements 626. A reference position 610 may be subtracted from the first head position measurement 626.1 at the summing junction 612.1 to form the first head PES 616.1. Similarly, a reference position 610 may be subtracted from the second head position measurement 626.2 at the summing junction 612.2 to form the second head PES 616.2. The per head PES 616 may be added together at the summing junction 614 and divided by 2 by the gain 618 to get the average PES, which may in turn be run through a VCM compensator 620 to get the gross VCM position adjustment 622. The gross VCM position adjustment 622 may be applied to the motor control circuit to simultaneously change the first head position 626.1 and second head position 626.2 respectively via the VCM and first arm dynamics 624.1 and the VCM and second arm dynamics 624.2]

Figure 6B:
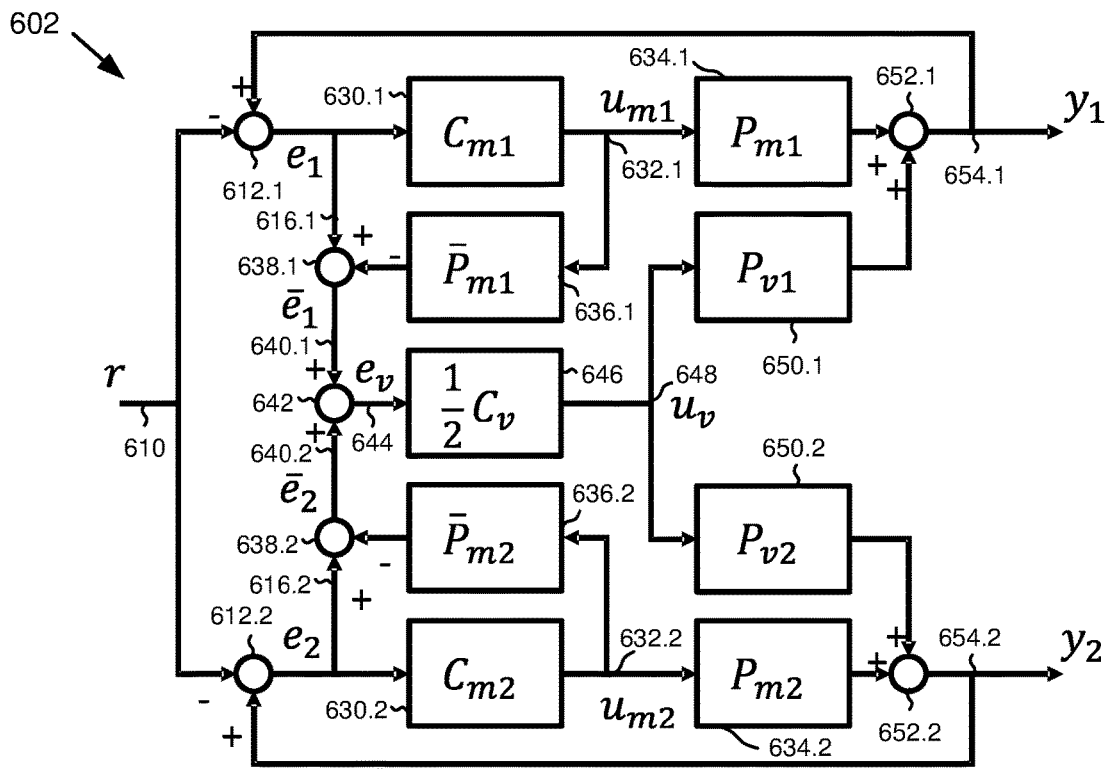

FIG. 6B shows another example compensator logic 602 that may determine the per head actuator compensation values 632 and the gross VCM position adjustment 648 based on per head position measurements 654. A reference position 610 may be subtracted from the first head position measurement 654.1 at summing junction 612.1 to form the first head PES 616.1. The first head PES 616.1 may be run through a first actuator compensator 630.1 to produce a first actuator compensation value 632.1. The first actuator compensation value 632.1 may be run through a first actuator model 636.1 to produce an estimated first actuator position, which may be in turn subtracted from the first head PES 616.1 at summing junction 638.1 to produce the first head decoupled PES 640.1; In parallel, a reference position 610 may be subtracted from the second head position measurement 654.2 at summing junction 612.2 to form the second head PES 616.2. The second head PES 616.2 may be run through a second actuator compensator 630.2 to produce a second actuator compensation value 632.2. The second actuator compensation value 632.2 may be run through a second actuator model 636.2 to produce an estimated second actuator position, which may be in turn subtracted from the second head PES 616.2 at summing junction 638.2 to produce the second head decoupled PES 640.2; The first head decoupled PES 640.1 and the second head decoupled PES 640.2 may be added together at summing junction 642, divided by 2, and passed through the VCM compensator to get the gross VCM position adjustment 648. The gross VCM position adjustment 648 and first actuator compensation value 632.1 may be respectively applied to the motor control circuit and the first actuator to change the first head position 654.1 via a superposition of the VCM and first arm dynamics 650.1 and the first actuator dynamics 634.1. In parallel, the second actuator compensation value 632.2 may be applied to the second actuator to change the second head position 654.2 via a superposition of the VCM and second arm dynamics 650.2 and the second actuator dynamics 634.2.]

Figure 7:
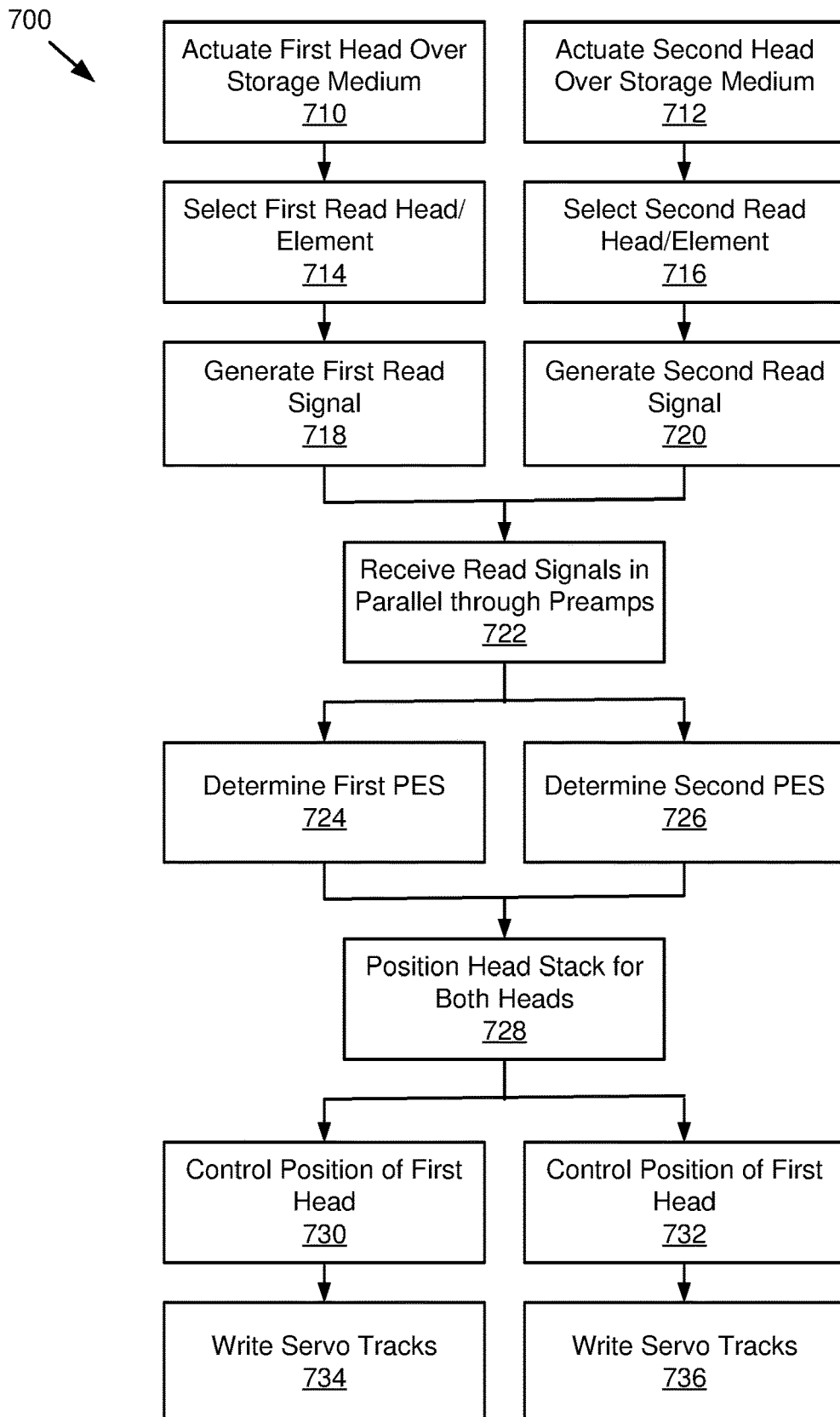
FIG. 7 is an example method of parallel self-servo writing.

As shown in FIG. 7, control circuitry 300 may be operated according to an example method of parallel self-servo writing using the various components described with regard to FIGS. 2A-6B, i.e., according to the method 700 illustrated by blocks 710-736.

At blocks 710 and 712, first and second heads are actuated over respective surfaces of a storage medium. For example, a controller may be responsible for controlling the motion of two heads selected from different head banks in a data storage device, where the first and second heads are suspended on arms over a storage medium surface and positioned by a combination of at least one VCM and at least one actuator on the arm supporting each head.

At blocks 714 and 716, different heads and corresponding read elements are selected for the parallel operation. For example, a controller may send control signals to two different preamplifier circuits to identify first and second target heads and the read sensors on those heads to be used, which may include selecting one of two read elements from each TDMR head.

At block 718 and 720, read signals may be generated from the selected read heads and elements. For example, the preamplifiers may initiate read voltages to the target heads and read elements and receive the sensor read signals generated by the first and second target heads and read elements.

At block 722, the read signals may be received in parallel through the respective preamplifier circuits. For example, the channel associated with the controller may include two read channel inputs connected to the preamplifier circuits and receive a read signal from each preamplifier in parallel.

At blocks 724 and 726, PES values may be determined for each head based on the received read signals. For example, the decoupled operation of the channel may determine separate first and second PES values for the first and second heads.

At block 728, the head stack may be positioned for both heads. For example, the controller may determine a VCM adjustment based on the two PES values to move the head stack that includes both head banks and the first and second target heads.

At blocks 730 and 732, the positions of the two heads relative to the position of the head stack may be controlled. For example, the servo controller may provide head-specific actuator adjustment values to actuators on the corresponding arms of the first and second heads.

At blocks 734 and 736, servo tracks may be written to both storage medium surfaces in parallel. For example, the controller may send servo pattern write signals to both the first target head and the second target head through their respective preamplifiers responsive to the head positions relative to SSW reference spirals being within corresponding error tolerance values.

Figure 8:
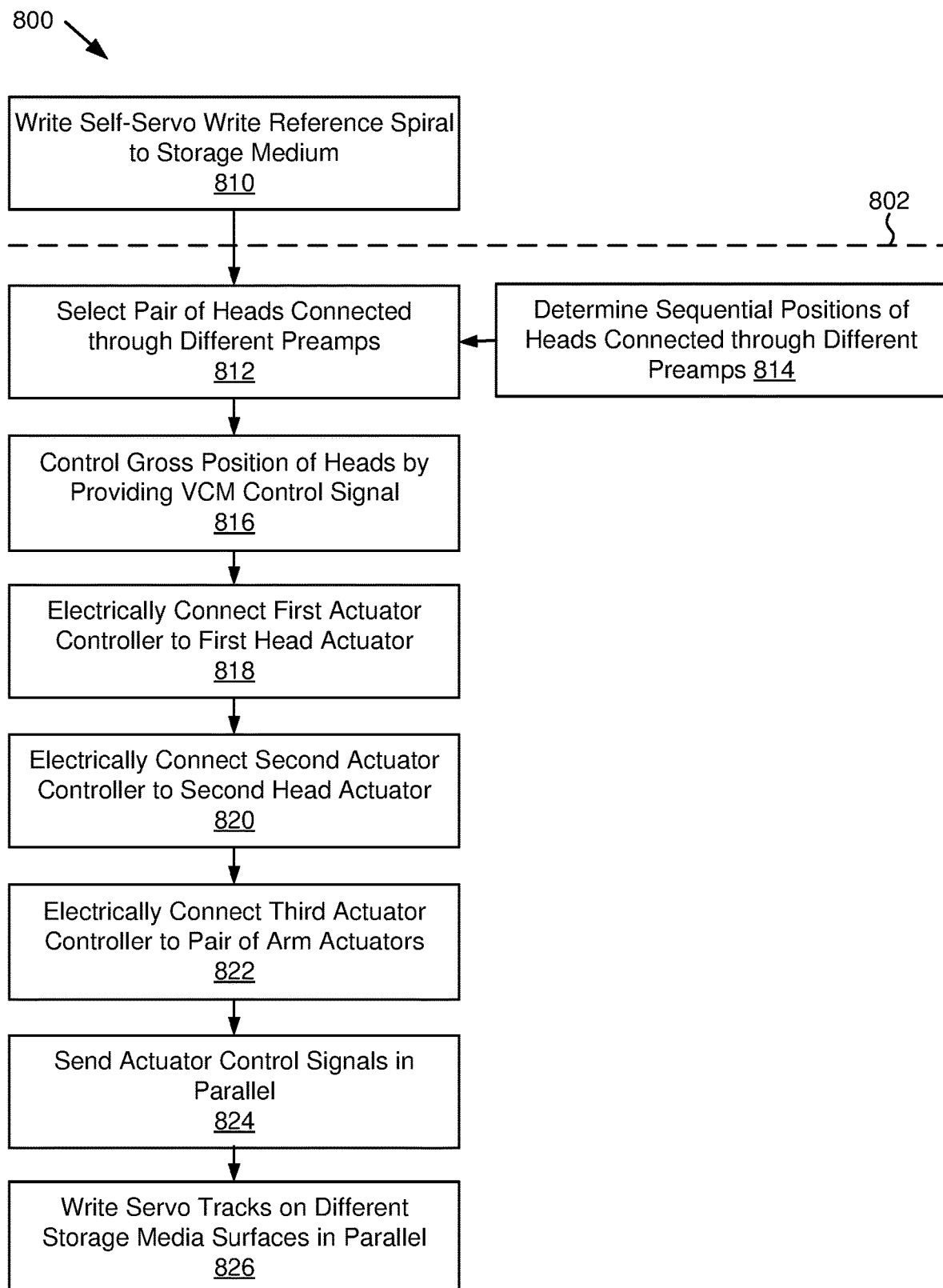
FIG. 8 is another example method of servo writing using an additional actuator controller.

As shown in FIG. 8, control circuitry 300 may be operated according to an example method of parallel self-servo writing using an additional actuator controller with the various components described with regard to FIGS. 2A-6B, i.e., according to the method 800 illustrated by blocks 810-826.

At block 810, a self-servo write reference spiral is written to the storage medium. For example, the controller may have previously written reference spirals to each storage medium surface of the data storage device.

At block 812, a pair of heads connected through different preamplifier circuits are selected. For example, the controller may select a head from each head bank where each head bank has its own preamplifier.

At block 814, sequential positions of the heads connected through different preamps may be determined. For example, the controller may be configured with sequential position information for the configuration of heads in each head bank and those sequential positions may be used at block 812 to select write pairs with one head from each bank according to a desired order of parallel self-servo writing, such as selecting the heads with the same sequential positions at block 812.

At block 816, gross position of the heads may be controlled by providing a VCM control signal to a VCM. For example, the controller may determine position information from the reference spirals for each head and determine an adjustment value to move the head stack using the VCM to grossly position both heads over the target servo write location.

At block 818, a first actuator controller may be electrically connected to a first head actuator. For example, the controller may generate a first actuator control signal for positioning an actuator on the arm supporting one of the selected heads and enable the control path between that actuator controller and the arm actuator for the head.

At block 820, a second actuator controller may be electrically connected to a second head actuator. For example, the controller may generate a second actuator control signal for positioning an actuator on the arm supporting the other of the selected heads and enable the control path between that actuator controller and the arm actuator for that head.

At block 822, a third actuator controller may be electrically connected to arm actuators for each of the heads. For example, each arm may include two actuators and one actuator on each arm may be controlled on each arm for differential positioning between the two arms, while a third actuator controller may be connected to and provide a common signal for the other actuators on those arms to hold them in a constant (relative) position.

At block 824, the actuator control signals may be sent in parallel. For example, the controller may send actuator control signals through the first, second, and third actuator controllers at the same time. Alternatively, the actuator control signals may be sent one after another.

At block 826, servo tracks may be written on different storage media surfaces in parallel. For example, based on the positioning provided by the three actuator control signals and the VCM control signal, the controller may send servo write signals to the pair of write heads to write respective servo sectors defining corresponding servo tracks on the two different storage medium surfaces corresponding to the selected heads.

Figure 9:
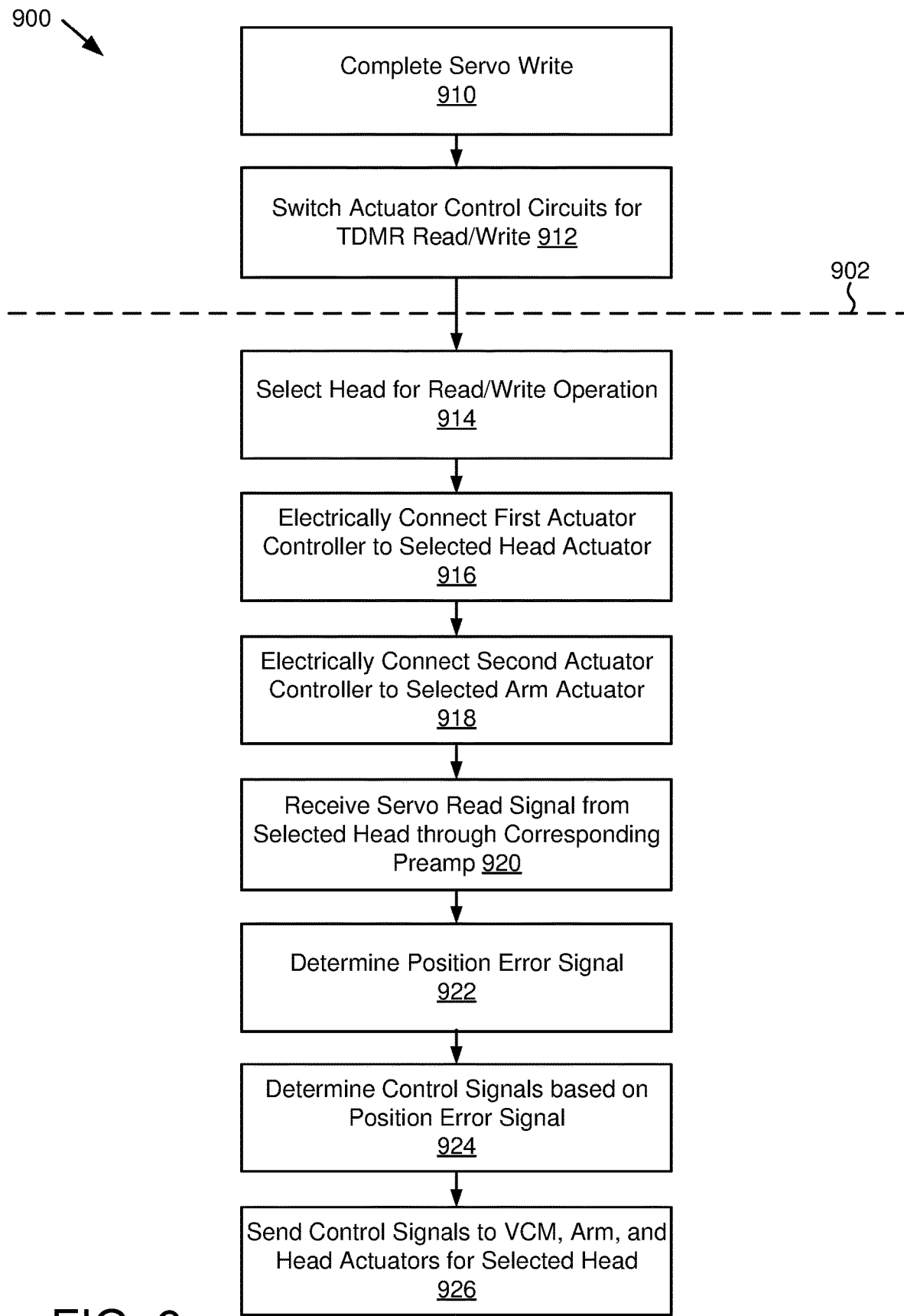
FIG. 9 is an example method of data read/write operations following completion of self-servo writing.

As shown in FIG. 9, control circuitry 300 may be operated according to an example method of data read/write operations following completion of self-servo writing with the various components described with regard to FIGS. 2A-6B, i.e., according to the method 900 illustrated by blocks 910-926. The blocks below line 902 may operate during a data read/write operating mode.

At block 910, servo write may be completed. For example, the controller may complete self-servo writing such that a full set of servo sectors defining the production servo tracks across one or more zones of the storage medium surfaces is complete and normal read/write servo operations can be supported based on the servo format.

At block 912, actuator control circuits may be switched for TDMR read/write. For example, the controller may activate switches in the servo interface controller to change the actuator control paths so that the two actuator controllers will control the two actuators on the arm of the target head.

At block 914, a head may be selected for a read/write operation. For example, responsive to a host read, write, or other data operation, the controller may determine the head to write to or read from a target location on the corresponding storage medium surface.

At blocks 916 and 918, the first actuator controller may be electrically connected to the selected head actuator and the second actuator controller may be electrically connected to the selected arm actuator. For example, the controller may connect the control paths from the first and second actuator controllers to the corresponding head and arm actuators on the arm supporting the head selected at block 914.

At block 920, the servo read signal may be received from the selected head through the corresponding preamplifier. For example, the controller may initiate servo read operations for the selected head, receive the read signals through the corresponding preamplifier to the read channels in the channel circuit.

At block 922, a position error signal may be determined based on the servo component of the read signals. For example, the channel circuit may determine a position error signal from the read signals from the selected head.

At block 924, control signals may be determined based on the position error signal. For example, a servo controller may determine separate control signals for the VCM, arm actuator, and head actuator to position the selected head for the read or write operation.

At block 926, the control signals may be sent to the corresponding VCM, arm actuator, and head actuators to position the selected head for the read or write operations. For example, the servo controller may send corresponding control signals to the VCM and the suspension and head actuators for the target head.

Figure 10:
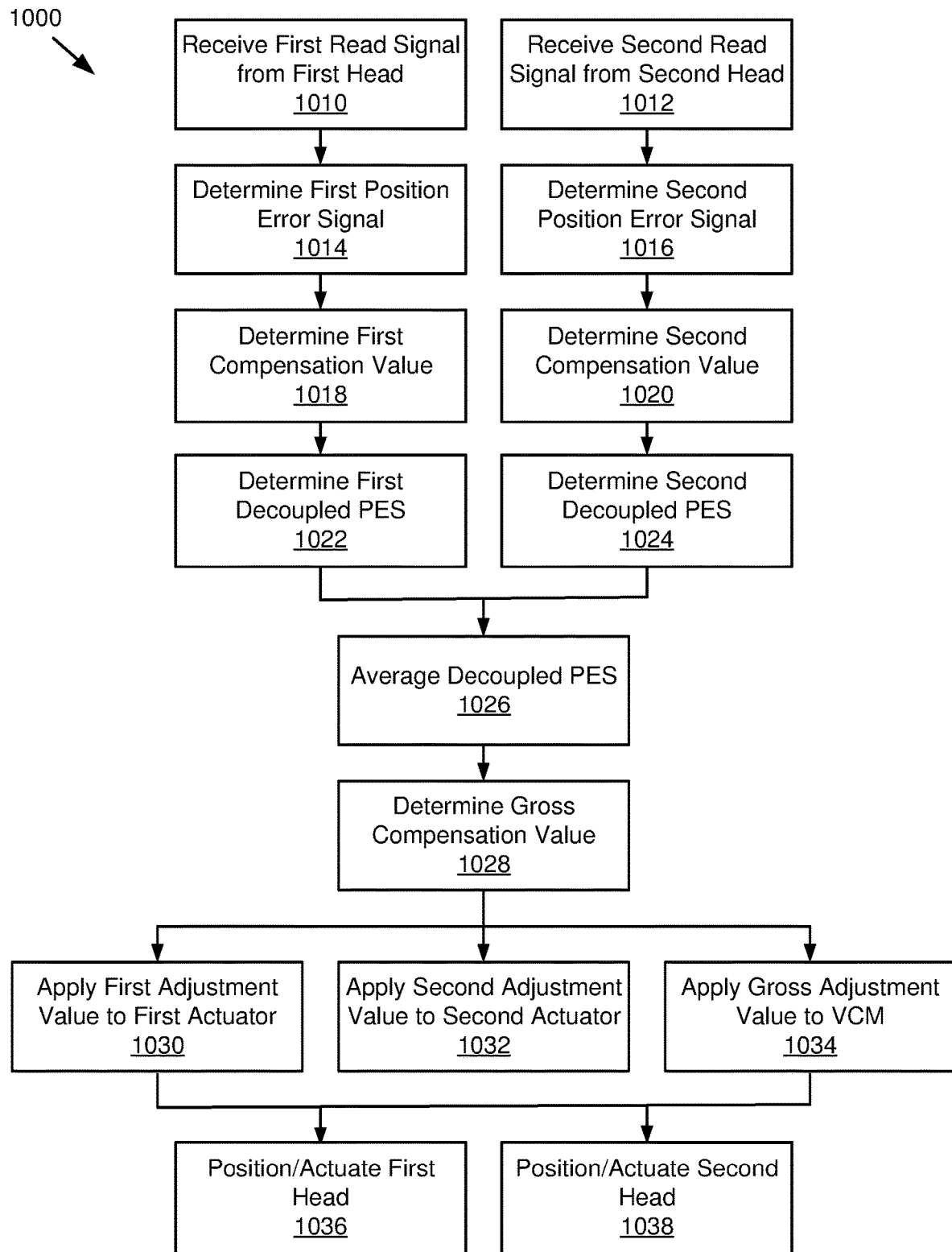
FIG. 10 is an example method of positioning heads for parallel self-servo writing.

As shown in FIG. 10, control circuitry 300 may be operated according to an example method of positioning heads for parallel self-servo writing with the various components described with regard to FIGS. 2A-6B, i.e., according to the method 1000 illustrated by blocks 1010-1038.

At blocks 1010 and 1012, read signals may be received in parallel from a pair of heads. For example, a servo write pair of a first head and a second head connected through different preamplifier circuits may generate first and second read signals from reference spirals on their respective storage medium surfaces.

At blocks 1014 and 1016, position error signals may be determined from each read signal. For example, decoupled read channels may determine separate first and second PES from the first and second read signals.

At block 1018 and 1020, a first compensation value may be determined for the first PES and a second compensation value may be determined for the second PES. For example, a servo controller may determine compensation values for the other head's PES.

At block 1022 and 1024, decoupled PES values may be determined for each head. For example, the servo controller may apply the compensation values determined at blocks 1014 and 1016 to decouple the first and second PES signals.

At block 1026, the decoupled PES may be averaged. For example, the first and second decoupled PES values may be added and then divided by two to determine an average decoupled PES value.

At block 1028, a gross or head stack compensation value may be determined. For example, based on the average decoupled PES, the servo controller may determine a VCM compensation value related to changing the position of the VCM and, thereby, the head stack including both heads in gross movement terms.

At blocks 1030, 1032, and 1034, different adjustment values may be applied to an actuator on the arm of each head and the VCM. For example, the servo controller may generate a first actuator adjustment value, a second actuator adjustment value, and a VCM adjustment value and send them to a servo interface to send corresponding control signals to the actuators and VCM.

At block 1036 and 1038, the two heads may be actuated and positioned over their respective storage medium surfaces for parallel self-servo write. For example, the combination of the VCM actuation and the actuator actuation on the arms of the first head and the second head may change the position of both heads for continuing self-servo write operations.

As shown in FIG. 11, control circuitry 300 may be operated according to an example method of compensating for different track positions between the two heads in parallel self-servo writing with the various components described with regard to FIGS. 2A-6B, i.e., according to the method 1100 illustrated by blocks 1110-1120.

At blocks 1110 and 1112, sequential positions for the two heads may be determined based on their TPIs. For example, as the controller manages the self-servo write of each servo track at the target (possibly different) first and second TPIs of the first and second heads in the write pair, the controller may determine the sequential passes (revolutions of the disk) and servo tracks written for each of the heads and the head movement needed for the next sequential servo track position.

At block 1114, a current distance between the heads may be determined based on PES. For example, the controller may calculate the relative positions of the heads from each other and based on the VCM position from their respective decoupled PES values and the adjustment values to be applied for the next revolution.

At block 1116, the next sequential position may be compared to a distance threshold. For example, the controller may compare the relative positions of the heads and their next sequential positions to determine whether they are within a distance threshold corresponding to the stroke ranges of the actuators being used to control the head positions relative to the VCM position.

At block 1118, the difference may be determined to be greater than the distance threshold. For example, the controller may determine, based on the comparison to the stroke distance threshold, that the next sequential track for one or both heads would be out of stroke range in opposite directions and milli actuator or micor actuator position would allow both tracks to be written in parallel.

At block 1120, the self-servo write of the head with the greater sequential position (in the direction in which the servo write operations are progressing) may be suspended for one or more revolutions. For example, the controller may suspend the servo write operation of the leading head for a number of complete rotations while continuing to write with the lagging head until the distance between heads is reduced below the distance threshold.

As shown in FIG. 12, control circuitry 300 may be operated according to an example method of managing seams between adjacent servo zones with different frequencies with the various components described with regard to FIGS. 2A-6B, i.e., according to the method 1200 illustrated by blocks 1210-1218.

At block 1210, a jump distance may be determined based on head parameters. For example, the controller may be configured with reader/writer geometry parameters for each head and use these parameters to determine a jump distance based on writer width differences and read/writer offset.

At block 1212, a servo zone may be written at a first TPI. For example, each head may be writing servo tracks for a first zone at corresponding servo TPI values.

At block 1214, a seam track between adjacent zones may be determined. For example, the controller may determine that the head is approaching the seam track between the first servo zone and a next or second servo zone and/or the butterfly seam track for servo write in different directions.

At block 1216, the head may be positioned by a jump distance between writing zones. For example, responsive to reaching the seam track, the jump distance may be applied to the arm/actuator target positions for the next sequential servo track, such as the first track at the next servo TPI.

At block 1218, a second servo zone may be written at a second servo TPI. For example, the next servo zone may be written at a different servo TPI than the prior servo zone. Note that the zone boundaries and timing of seam jumps may be different between the two heads during parallel self-servo write.

At block 1220, a zone boundary offset may be determined for each zone boundary and used for operations on the servo pattern. For example, the controller may measure the actual jump distance on each surface for operations referencing the product servo pattern: The head may be commanded to seek across the servo zone boundary at a known velocity. At the point of the track number jump due to neighboring servo zones having a discontinuous servo track number, there will be an artificial velocity glitch if a track number offset is not added. Put it in other words, the track number offset that yields a continuous velocity when crossing the zone boundary without control command change is the track number offset due to thermal drift and also the head width change due to different edge of the writer is used and or the reader to writer offset being different at different servo frequency. Note that when the zone boundary have overlap patterns, the wedge to wedge time jump in between the two servo zones also needs to be accounted for when calculating the head velocities.

As shown in FIG. 13, control circuitry 300 may be operated according to an example method of managing thermal creep during parallel self-servo writing with the various components described with regard to FIGS. 2A-6B, i.e., according to the method 1300 illustrated by blocks 1310-1320.

At block 1310, a thermal offset value may be determined. For example, the controller may be configured with an experimentally determined thermal model based on the relative shift between write pairs caused by thermal changes to the head and/or disk stacks over operation of the data storage device and, more specifically, periods of self-servo write operations. The thermal model may determine the thermal offset value based on time and/or temperature sensor values determined by the controller.

At block 1312, the position error signals may be modified based on the thermal offset value. For example, the servo controller may apply the thermal offset value to the PES-based adjustment values determined for the VCM and actuators.

At block 1314, changes in thermal gain may be determined over self-servo write operations. For example, based on the distance between the two heads going through the parallel SSW, spindle motor design, the elapsed operating time and/or changing temperature sensor inputs, thermal gains (or losses) may be modeled using the thermal model for the data storage device.

At block 1316, the thermal offset value may vary based on the changes in thermal gains. For example, the thermal model may be a transfer function that determines the thermal offset value from the operating time and/or temperature sensor inputs to compensate for the changing thermal load and attendant changes in geometry that impact the relative positions of the write pair of heads. The changing thermal offset values may be used by the servo controller to continuously modify the position error signals and/or resulting motor/actuator adjustment values.

At block 1318, servo tracks may be written to the storage medium surfaces. For example, the controller may use the write head pair to write their respective servo patterns to their storage medium surface based on the thermally compensated position control.

At block 1320, an erase band may be written. For example, at each zone seam and/or the ID and OD of the servo pattern, the controller may cause the write heads to write an erase band to remove any residual signals from previously written servo patterns or reference spirals.

Figure 14A:
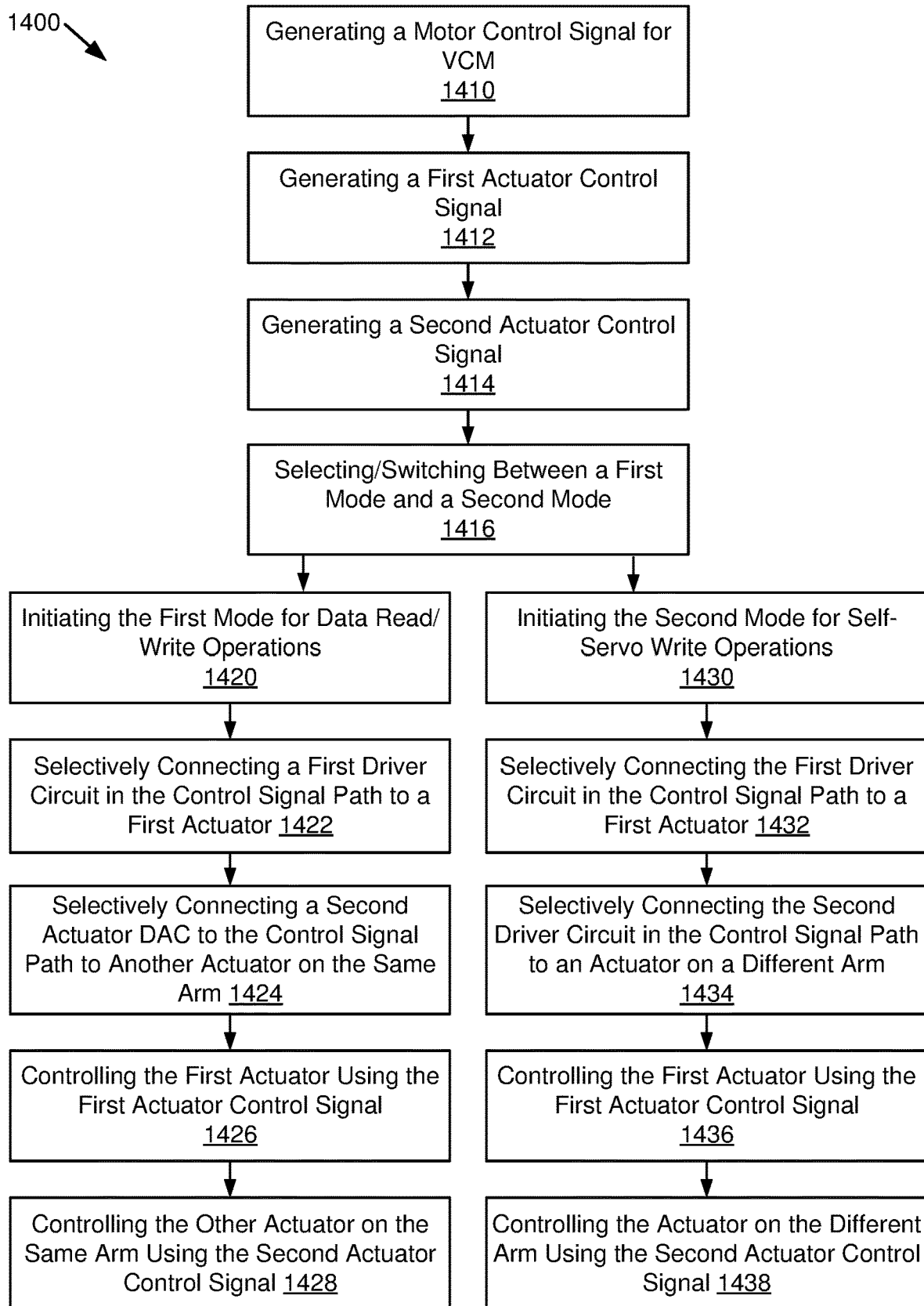
FIG. 14A is an example method of controlling multiple actuators for each head during self-servo writing and data read/write operations.

As shown in FIG. 14A, control circuitry 300 may be operated according to an example method of controlling multiple actuators for each head during self-servo writing and data read/write operations with the various components described with regard to FIGS. 2A-6B, i.e., according to the method 1400 illustrated by blocks 1410-1438.

At block 1410, a motor control signal may be generated for the VCM. For example, a servo interface circuit may include a DAC for receiving a digital VCM control signal from a servo controller and converting it to an analog VCM control signal provided to the VCM.

At blocks 1412, a first actuator control signal may be generated. For example, the servo interface circuit may include a first actuator DAC for receiving a first digital actuator control signal from the servo controller and converting it to an analog actuator control signal provided to a selected piezoelectric actuator on a selected arm for a selected head.

At block 1414, a second actuator control signal may be generated. For example, the servo interface circuit may include a second actuator DAC for receiving a second digital actuator control signal from the servo controller and converting it to an analog actuator control signal provided to another selected piezoelectric actuator on a selected arm for a selected head.

At block 1416, a servo interface controller may be switched between a first mode and a second mode. For example, a controller may select the operating mode of the servo interface controller depending on whether data read/write or self-servo write operations are being initiated.

At block 1420, a first mode may be initiated for data read/write operations. For example, the controller may select the first mode following completion of self-servo write operations.

At block 1422, a first dual-phase driver circuit may be selectively connected in the control signal path to a first actuator. For example, the servo interface circuit may be switched to connect the first actuator DAC through the first dual-phase driver circuits to the control signal path to a first actuator on the arm of a selected head.

At block 1424, the second actuator DAC may be selectively connected to the control signal path to another actuator on the same arm. For example, the servo interface circuit may be switched to connect the second actuator DAC to the control signal path for a second actuator on the arm of the selected head.

At blocks 1426 and 1428, the first actuator may be controlled using the first actuator control signal and the second actuator on the same arm may be controlled using the second actuator control signal for positioning the head on that arm. For example, each arm may include a milli actuator and a micro actuator and the two actuator control signals may control those actuators in parallel for positioning the head over the desired track position for read/write operations.

At block 1430, a second mode may be initiated for data self-servo write operations. For example, the controller may select the second mode during configuration and testing of a data storage device to write the production servo pattern to the storage media surfaces.

At block 1432, the first dual-phase driver circuit may be selectively connected in the control signal path to a first actuator. For example, the servo interface circuit may be switched to connect the first actuator DAC through the first dual-phase driver circuit to the control signal path to a first actuator on the arm of a first selected head in one head bank connected to a corresponding preamplifier.

At block 1434, a second dual-phase driver circuit may be selectively connected to the control signal path to another actuator on another arm. For example, the servo interface circuit may be switched to connect the second actuator DAC through the second dual-phase driver circuit to the control signal path for an actuator on the arm of a different selected head from another head bank connected to a different preamplifier.

At blocks 1436 and 1438, the actuator on one arm may be controlled using the first actuator control signal and the actuator on the other arm may be controlled using the second actuator control signal for positioning two heads in parallel. For example, each arm may include a milli actuator and a micro actuator and the two actuator control signals may control the micro actuators on the two arms in parallel for positioning the heads over the desired servo write position for servo write operations.

Figure 14B:
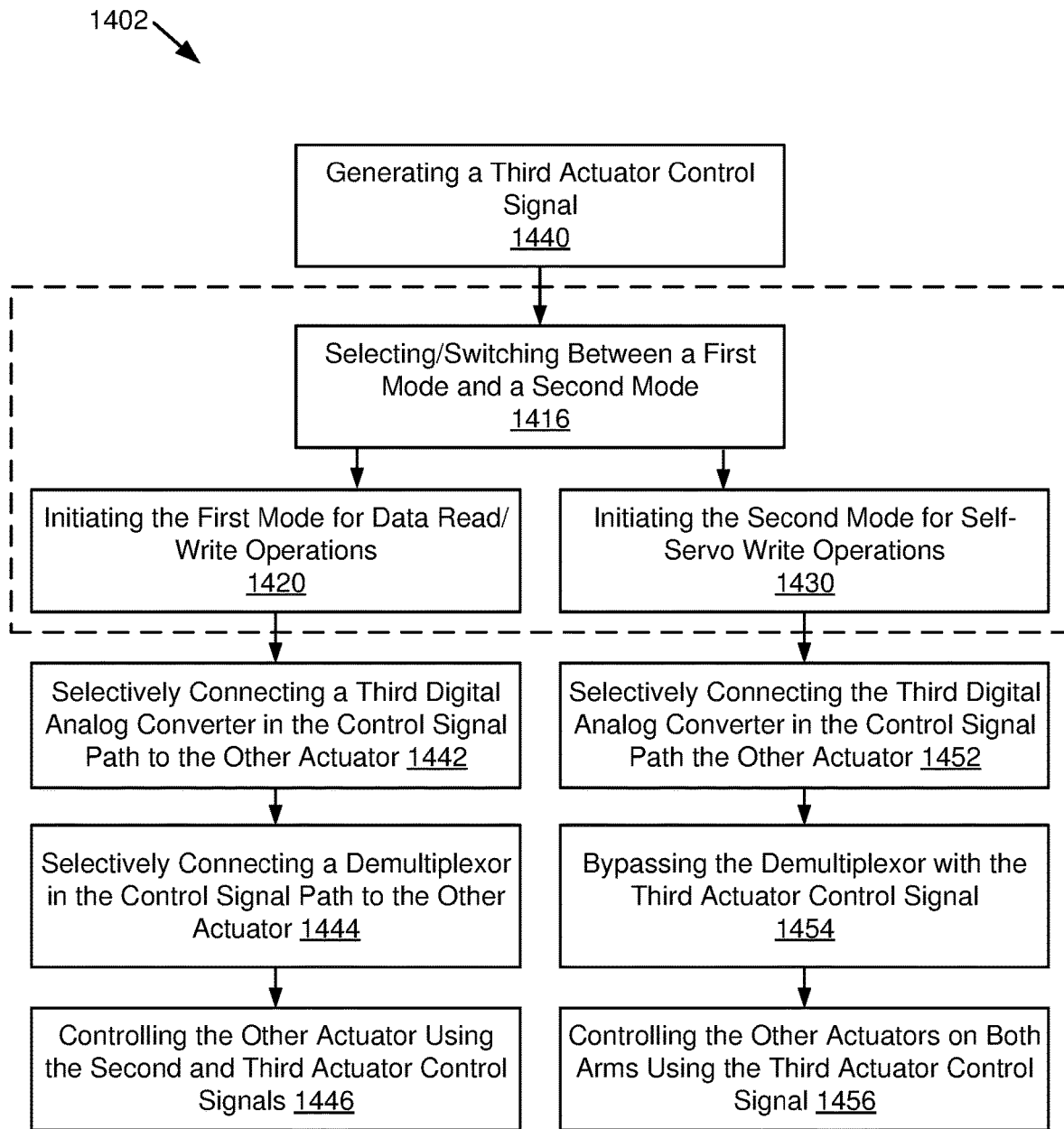
FIG. 14B is another example method of controlling multiple actuators for each head during self-servo writing and data read/write operations.

As shown in FIG. 14B, control circuitry 300 may be further operated according to an example method of controlling multiple actuators for each head during self-servo writing and data read/write operations with the various components described with regard to FIGS. 2A-6B, i.e., according to the method 1402 illustrated by blocks 1440-1456. Method 1402 supplements method 1400 in configurations that include a third actuator DAC in the servo interface circuit. Blocks 1416, 1420, and 1430 are repeated from method 1400 and the remaining blocks in method 1402 may operate in conjunction with the remaining blocks of method 1400.

At block 1440, a third actuator control signal may be generated. For example, the servo interface circuit may include a third actuator DAC for receiving a third digital actuator control signal from the servo controller and converting it to an analog actuator control signal provided to another selected piezoelectric actuator.

At block 1442, a third actuator DAC may be selectively connected in the control signal path to the actuator connected to the second actuator control signal. For example, the third actuator DAC may provide an analog control signal for one leg for controlling the second actuator during head switching operations.

At block 1444, selectively connecting a demultiplexor in the control signal path to the actuator connected to the second actuator control signal. For example, the third actuator DAC may receive the same digital control signal from milli actuator DAC through a digital signal processor to provide one leg of the milli actuator control signal while the milli actuator DAC signal passes through the demultiplexor to provide the other leg of the milli actuator control signal during head switch operating.

At block 1446, the actuator may be controlled using the second and third actuator control signals. For example, the two-channel milli actuator driver may receive an outer analog control signal from the third actuator DAC and an inner analog control signal from the second actuator DAC to position the target head during data read/write operating mode.

At block 1452, the third actuator DAC may be selectively connected to the control signal path(s) for one or more actuators not being controlled by the first and second actuator DACs. For example, during self-servo write operations, the third actuator DAC may be connected to both milli actuator channels where the milli actuators of the same parallel SSW pair are connected to move in opposite directions when actuated, thereby providing a relative position adjustment capability such as low frequency, including DC, position adjustment, while the milli actuator DAC is connected to the micro actuator of the second head in the write pair.

At block 1454, the demultiplexor may be bypassed by the third actuator control signal. For example, both the third actuator control signal from the third actuator DAC and the second actuator control signal from the second actuator DAC may be switched to bypass the demultiplexor as they provide separate signals to their respective connected actuators. The digital signal processor may similarly be disabled during parallel self-servo write operations.

At block 1456, the one or more other actuators may be controlled on both arms using the third actuator control signal. For example, the third actuator DAC may provide the third analog actuator control signal through the two milli actuator channels to the milli actuator on each arm of the selected write pair.

Figure 15A:
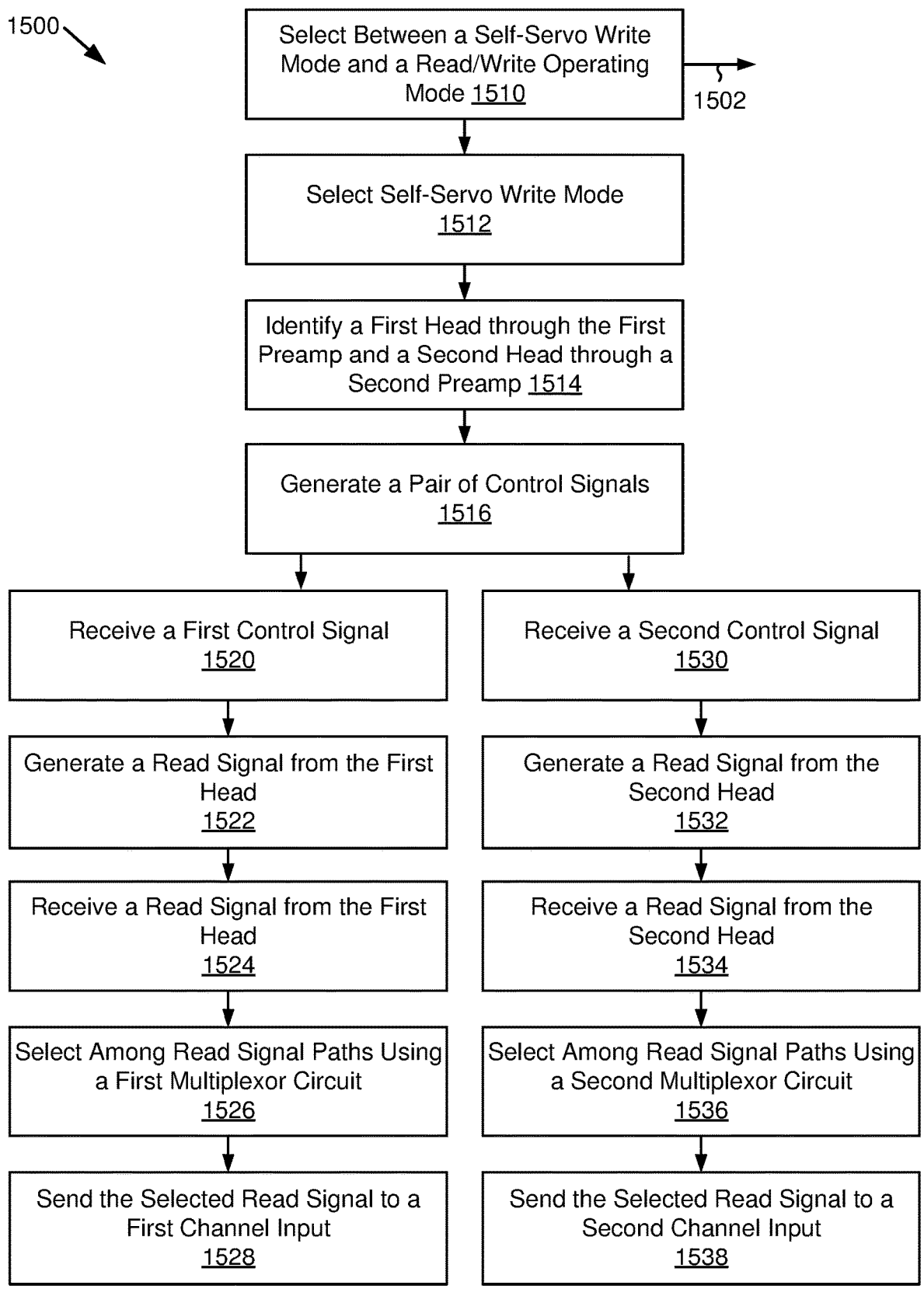
FIG. 15A is an example method of controlling preamplifier circuits during self-servo writing.

As shown in FIG. 15A, control circuitry 300 may be operated according to an example method of controlling preamplifier circuits during self-servo writing with the various components described with regard to FIGS. 2A-6B, i.e., according to the method 1500 illustrated by blocks 1510-1538. At 1502, method 1500 may pass operation to method 1504 in FIG. 15B.

At block 1510, a selection between a self-servo write mode and a read/write operating mode may be determined. For example, a controller may select the servo operating mode for the data storage device depending on whether data read/write or self-servo write operations are being initiated.

At block 1512, a self-servo writing mode may be selected. For example, the controller may select the self-servo write mode during manufacturing and testing the data storage device to populate the servo format on the set of storage media surfaces.

At block 1514, a first head connected through a first preamplifier circuit and a second head connected through a second preamplifier circuit may be identified. For example, the controller may select a write pair from two or more head banks supported by separate preamplifier circuits.

At block 1516, a pair of control signals for the preamplifier circuits may be generated. For example, the controller may generate sensor enable signals for both of the preamplifier circuits connected to target heads.

At blocks 1520 and 1530, the first control signal and the second control signal may be received by their respective preamplifier circuits. For example, a first preamplifier circuit for the first target head may receive the first control signal in parallel with the second preamplifier circuit receiving the second control signal.

At blocks 1522 and 1532, read signals may be generated from the target heads. For example, the first head may receive a read voltage from the first preamplifier circuit and return a first analog read signal to that preamplifier circuit, and the second head may receive the read voltage from the second preamplifier circuit and return a second analog read signal to that preamplifier circuit.

At blocks 1524 and 1534, read signals from the target heads may be received by their respective preamplifier circuits. For example, the first preamplifier circuit may receive the first analog read signal to a corresponding sensor amplifier input and the second preamplifier circuit may receive the second analog read signal to a corresponding sensor amplifier input.

At blocks 1526 and 1536, read signal paths may be selected using multiplexor circuits in the respective preamplifier circuits. For example, the first preamplifier circuit may activate a first multiplexor for selecting one of the read sensor signals from the target head and connecting it to a corresponding read driver for that read channel, and the second preamplifier circuit may activate another multiplexor circuit for selecting one of the read sensor signals from the other target head and connecting it to the corresponding read driver for the other read channel.

At blocks 1528 and 1538, the selected read signals may be sent to corresponding channel inputs on the read channel circuit. For example, the first preamplifier may send its selected read sensor signal to one read channel input and the second preamplifier may send its selected read sensor signal to the other read channel input.

Figure 15B:
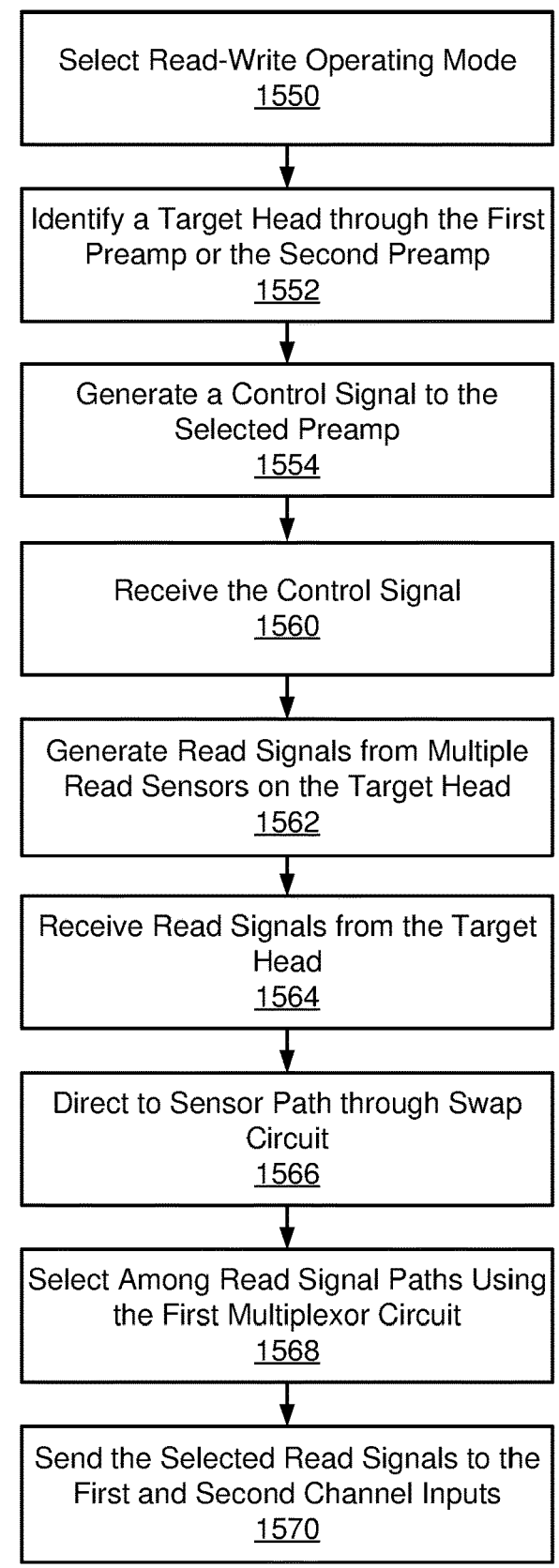
FIG. 15B is an example method of controlling preamplifier circuits during data read/write operations.

As shown in FIG. 15B, control circuitry 300 may be operated according to an example method of controlling preamplifier circuits during data read/write operations with the various components described with regard to FIGS. 2A-6B, i.e., according to the method 1504 illustrated by blocks 1550-1570.

At block 1550, a data read/write operating mode may be selected. For example, the controller may select the data read/write operating mode after self-servo writing is complete and a functioning servo pattern is established on the storage medium surfaces. This may include during continued testing of data format, read/write channel settings, and other configuration operations prior to production use of the data storage device.

At block 1552, a target head connected through any preamplifier circuit may be identified for a read/write operation. For example, the controller may select a target head for a data read/write operation.

At block 1554, a control signal for the preamplifier circuit connected to the target head may be generated. For example, the controller may generate a sensor enable signal for the preamplifier circuit connected to target head that identifies the target head.

At block 1560, the control signal may be received by the preamplifier circuit. For example, a preamplifier circuit for the target head may receive the sensor enable control signal.

At block 1562, read signals may be generated from multiple read sensors on the target head. For example, the target head may receive read voltages to both read sensors on that head from the preamplifier circuit and return a first and second analog read signals to that preamplifier circuit.

At block 1564, read signals from the target head may be received by the preamplifier circuit. For example, the preamplifier circuit may receive the first analog read signal and the second analog read signal to corresponding sensor amplifier inputs.

At block 1566, the amplified read signals from the sensor amplifiers may be directed through a sensor path through a swap circuit. For example, the amplified read signals may pass through a swap circuit that directs the two sensor signals to different multiplexors and read drivers in the preamplifier circuit.

At block 1568, read signal paths may be selected using multiplexor circuits in the preamplifier circuit. For example, the preamplifier circuit may activate multiplexors in each sensor path for selecting the respective read sensor signals from the target head and connecting them to the corresponding read driver for the two TDMR read channels.

At block 1570, the selected read signals may be sent to corresponding channel inputs on the read channel circuit. For example, the preamplifier circuit may send its selected read sensor signals for the target head to the two channel inputs for the TDMR read channel.

Technology for parallel self-servo writing based on data storage device hardware and software switchable between parallel self-servo write mode and data read/write operating mode, is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device, comprising:
control circuitry configured to:
receive a first read signal from a first head actuated over a first storage medium surface;
receive a second read signal from a second head actuated over a second storage medium surface, wherein the first read signal and the second read signal are received in parallel;
determine a first position error signal from the first read signal;
determine a second position error signal from the second read signal;
determine, based on the first position error signal a first position compensation value;
determine, based on the second position error signal, a second position compensation value;
determine, based on the first position compensation value and the first position error signal, a first decoupled position error signal;
determine, based on the second position compensation value and the second position error signal, a second decoupled position error signal;
determine, based on the first decoupled position error signal and the second decoupled position error signal, a gross position compensation value;
apply the gross position compensation value to a motor control circuit configured to synchronously move a first arm and a second arm;
apply the first position compensation value to a first actuator on the first arm for the first head to position the first head; and
apply the second position compensation value to a second actuator on the second arm for the second head to position the second head.

2. The data storage device of claim 1, wherein the control circuitry is further configured to:
determine, based on a difference between the first position error signal and the second position error signal, a third position compensation value; and
apply the third compensation value to at least one actuator to compensate for an offset between the first position error signal and the second position error signal.

3. The data storage device of claim 1, wherein:
the first read signal is responsive to a first self-servo write reference spiral on the first storage medium surface;
the second read signal is responsive to a second self-servo write reference spiral on the second storage medium surface; and
the control circuitry is further configured to:
write, using the first head, a first set of servo tracks to the first storage medium surface; and
write, using the second head, a second set of servo tracks to the second storage medium surface in parallel with writing the first set of servo tracks.

4. The data storage device of claim 3, wherein the control circuitry is further configured to:
position the first head using the first self-servo write reference spiral to determine sequential positions for writing the first set of servo tracks using a first tracks per inch parameter;

position the second head using the second self-servo write reference spiral to determine positions for writing the second set of servo tracks using a second tracks per inch parameter; and suspend, responsive to a next sequential position of the first head being greater than a distance threshold for a next sequential position of the second head, writing of the first set of servo tracks for at least one revolution while continuing to write the second set of servo tracks.

5. The data storage device of claim 4, wherein the distance threshold is based on a stroke capability of the first actuator and the second actuator.

6. The data storage device of claim 3, wherein the control circuitry is further configured to:

position the first head using the first position error signal to determine a direct current position compensation value and a first alternating current position compensation value for the first position compensation value; and position the second head using the second position error signal to determine a second alternating current position compensation value for the second position compensation value.

7. The data storage device of claim 3, wherein the control circuitry is further configured to:

subtract a first direct current component of the first position compensation value from the second position compensation value; and subtract a second direct current component of the second position compensation value from the first position compensation value.

8. The data storage device of claim 3, wherein:

the first set of servo tracks comprises:
at least two adjacent zones of servo tracks having different track per inch parameters in each adjacent zone; and
at least one seam track at a boundary between the at least two adjacent zones; and the control circuitry is further configured to position, responsive to the at least one seam track, the first head a jump distance between writing the servo tracks of the at least two adjacent zones based on:
a read/write offset between a read element and a write element of the first head; and
a difference between a first writer width of the first head and a second writer width of the second head.

9. The data storage device of claim 3, wherein the control circuitry is further configured to:

determine, based on thermal changes impacting a position relationship between the first head and the second head, a thermal offset value;

modify, based on the thermal offset value, the first position error signal; and vary the thermal offset value over operation of a self-servo write mode.

10. The data storage device of claim 9, wherein:

the control circuitry is further configured to write, responsive to writing the first set of servo tracks, an erase band of tracks using an erase pattern; and the erase band has an erase band width based on a range of thermal offset values.

11. The data storage device of claim 1, wherein the control circuitry receives:

the first read signal from the first head through a first preamplifier circuit; and the second read signal from the second head through a second preamplifier circuit.

12. A method comprising:

receiving a first read signal from a first head actuated over a first storage medium surface;

receiving a second read signal from a second head actuated over a second storage medium surface, wherein the first read signal and the second read signal are received in parallel;

determining a first position error signal from the first read signal;

determining a second position error signal from the second read signal;

determining, based on the first position error signal a first position compensation value;

determining, based on the second position error signal, a second position compensation value;

applying the first position compensation value to a first actuator on a first arm for the first head to position the first head;

applying the second position compensation value to a second actuator on a second arm for the second head to position the second head;

writing, using the first head, a first set of servo tracks to the first storage medium surface, wherein the first read signal is responsive to a first self-servo write reference spiral on the first storage medium surface; and writing, using the second head, a second set of servo tracks to the second storage medium surface in parallel with writing the first set of servo tracks, wherein the second read signal is responsive to a second self-servo write reference spiral on the second storage medium surface.

13. The method of claim 12, further comprising:

determining, based on a difference between the first position error signal and the second position error signal, a third position compensation value; and applying the third position compensation value to at least one actuator to compensate for an offset between the first position error signal and the second position error signal.

14. The method of claim 12, further comprising:

determining, based on the first position error signal and the second position error signal, a gross position compensation value; and applying the gross position compensation value to a motor control circuit configured to synchronously move the first arm and the second arm.

15. The method of claim 14, further comprising:

determining, based on the first position compensation value and the first position error signal, a first decoupled position error signal;

determining, based on the second position compensation value and the second position error signal, a second decoupled position error signal; and averaging the first decoupled position error signal and the second decoupled position error signal to determine the gross position compensation value.

16. The method of claim 12, further comprising:

positioning the first head using the first self-servo write reference spiral to determine sequential positions for writing the first set of servo tracks using a first tracks per inch parameter;

positioning the second head using the second self-servo write reference spiral to determine positions for writing the second set of servo tracks using a second tracks per inch parameter; and suspending, responsive to a next sequential position of the first head being greater than a distance threshold for a next sequential position of the second head, writing of the first set of servo tracks for at least one revolution while continuing to write the second set of servo tracks.

17. The method of claim 12, further comprising:
positioning, responsive to at least one seam track, the first head a jump distance between writing the servo tracks of at least two adjacent zones based on:
 a read/write offset between a read element and a write element of the first head; and
 a difference between a first writer width of the first head and a second writer width of the second head, wherein:
  the at least two adjacent zones of servo tracks have different track per inch parameters; and
  the at least one seam track at a boundary between the at least two adjacent zones.

18. The method of claim 12, further comprising:
determining, based on thermal changes impacting a position relationship between the first head and the second head, a thermal offset value;
modifying, based on the thermal offset value, the first position error signal; and
varying the thermal offset value over operation of a self-servo write mode.

19. The method of claim 12, further comprising:
writing, responsive to writing the first set of servo tracks, an erase band of tracks using an erase pattern, wherein the erase band has an erase band width based on a range of thermal offset values.

20. The method of claim 12, wherein:
receiving the first read signal from the first head comprises receiving the first read signal through a first preamplifier circuit; and
receiving the second read signal from the second head comprises receiving the second read signal from the second head through a second preamplifier circuit.

21. A data storage device comprising:
a first head actuated over a first storage medium surface;
a second head actuated over a second storage medium surface;
means for receiving a first read signal from the first head;
means for receiving a second read signal from the second head, wherein the first read signal and the second read signal are received in parallel;
means for determining a first position error signal from the first read signal;
means for determining a second position error signal from the second read signal;
means for determining, based on the first position error signal a first position compensation value;
means for determining, based on the second position error signal, a second position compensation value;
means for applying the first position compensation value to a first actuator on a first arm for the first head to position the first head; and
means for applying the second position compensation value to a second actuator on a second arm for the second head to position the second head;
means for writing, using the first head, a first set of servo tracks to the first storage medium surface, wherein the first read signal is responsive to a first self-servo write reference spiral on the first storage medium surface; and
means for writing, using the second head, a second set of servo tracks to the second storage medium surface in parallel with writing the first set of servo tracks, wherein the second read signal is responsive to a second self-servo write reference spiral on the second storage medium surface.

22. A data storage device, comprising:
control circuitry configured to:
 receive a first read signal from a first head actuated over a first storage medium surface;
 receive a second read signal from a second head actuated over a second storage medium surface, wherein the first read signal and the second read signal are received in parallel;
 determine a first position error signal from the first read signal;
 determine a second position error signal from the second read signal;
 determine, based on the first position error signal a first position compensation value;
 determine, based on the second position error signal, a second position compensation value;
 apply the first position compensation value to a first actuator on a first arm for the first head to position the first head;
 apply the second position compensation value to a second actuator on a second arm for the second head to position the second head;
 write, using the first head, a first set of servo tracks to the first storage medium surface, wherein the first read signal is responsive to a first self-servo write reference spiral on the first storage medium surface; and
 write, using the second head, a second set of servo tracks to the second storage medium surface in parallel with writing the first set of servo tracks, wherein the second read signal is responsive to a second self-servo write reference spiral on the second storage medium surface.

* * * * *